United States Patent
Mukherjee et al.

(10) Patent No.: US 9,738,543 B2
(45) Date of Patent: Aug. 22, 2017

(54) DISINFECTING WATER DEVICE

(71) Applicant: NITTO DENKO CORPORATION, Osaka (JP)

(72) Inventors: Rajesh Mukherjee, Irvine, CA (US); Benjamin M. Weaver, Oceanside, CA (US); Tao Gu, Carlsbad, CA (US); Jiadong Zhou, San Diego, CA (US); Bin Zhang, San Diego, CA (US)

(73) Assignee: NITTO DENKO CORPORATION, Osaka (JP)

( * ) Notice: Subject to any disclaimer, the term of this patent is extended or adjusted under 35 U.S.C. 154(b) by 637 days.

(21) Appl. No.: 14/102,119

(22) Filed: Dec. 10, 2013

(65) Prior Publication Data
US 2014/0158641 A1 Jun. 12, 2014

Related U.S. Application Data

(60) Provisional application No. 61/735,473, filed on Dec. 10, 2012.

(51) Int. Cl.
*C02F 1/00* (2006.01)
*C02F 1/30* (2006.01)
(Continued)

(52) U.S. Cl.
CPC .............. *C02F 1/002* (2013.01); *C02F 1/30* (2013.01); *C02F 1/32* (2013.01); *C02F 1/444* (2013.01); *C02F 1/725* (2013.01); *B01D 35/02* (2013.01); *B01D 35/30* (2013.01); *B01D 65/022* (2013.01); *B01D 65/08* (2013.01);
(Continued)

(58) Field of Classification Search
CPC .... C02F 1/002; C02F 1/30; C02F 1/32; C02F 1/44; C02F 1/441; C02F 1/442; C02F 1/444; C02F 1/445; C02F 1/447; C02F 1/448; C02F 2303/04; C02F 2305/10; C02F 1/725; C02F 2307/02; B01D 2321/168; B01D 35/02; B01D 35/30; B01D 65/022; B01D 65/08
See application file for complete search history.

(56) References Cited

U.S. PATENT DOCUMENTS 5,227,053 A 7/1993 Brym
5,376,281 A 12/1994 Safta
(Continued)

FOREIGN PATENT DOCUMENTS

DE 102007049736 A1 4/2009
JP H11047738 A 2/1999
(Continued)

*Primary Examiner* — Lucas Stelling
(74) *Attorney, Agent, or Firm* — K&L Gates LLP; Louis C. Cullman; Robert W. Winn

(57) ABSTRACT

Described herein are devices for providing drinking fluid from feed sources comprising: a first reservoir, a filter for mechanically removing particles and a second reservoir for receipt of the processed feed fluid. A continually disinfecting element is disposed in either or both reservoirs to remove additional materials from the fluid. Drinking fluid is provided in a portable device. Optional light sources are provided to interact with the disinfecting elements and/or provide an indication of the contained suitability of such disinfecting elements. A method for creating drinking fluid from a feed source is also disclosed.

35 Claims, 11 Drawing Sheets

(51) Int. Cl.
*C02F 1/44* (2006.01)
*C02F 1/72* (2006.01)
*C02F 1/32* (2006.01)
*B01D 35/30* (2006.01)
*B01D 35/02* (2006.01)
*B01D 65/02* (2006.01)
*B01D 65/08* (2006.01)

(52) U.S. Cl.
CPC ...... *C02F 2303/04* (2013.01); *C02F 2305/10* (2013.01); *C02F 2307/02* (2013.01)

(56) References Cited

U.S. PATENT DOCUMENTS

| | | | |
|---|---|---|---|
| 5,490,938 A * | 2/1996 | Sawan | B01D 69/02 210/321.84 |
| 5,501,801 A | 3/1996 | Zhang et al. | |
| 5,779,912 A | 7/1998 | Gonzalez-Martin et al. | |
| 5,943,950 A | 8/1999 | Taoda et al. | |
| 6,315,963 B1 | 11/2001 | Speer | |
| 6,409,928 B1 | 6/2002 | Gonzalez | |
| 6,419,821 B1 | 7/2002 | Gadgil | |
| 6,524,447 B1 * | 2/2003 | Carmignani | C02F 1/725 204/157.15 |
| 6,902,653 B2 | 6/2005 | Carmignani | |
| 7,029,768 B1 | 4/2006 | Ohmori | |
| 7,247,237 B2 | 7/2007 | Mori et al. | |
| 7,384,614 B2 | 6/2008 | Hayashi | |
| 7,396,459 B2 | 7/2008 | Thorpe | |
| 7,981,285 B2 | 7/2011 | Thorpe | |
| 8,173,015 B2 | 5/2012 | Foster et al. | |
| 2003/0164333 A1* | 9/2003 | Nohren, Jr. | C02F 1/002 210/650 |
| 2004/0262217 A1 | 12/2004 | Mori et al. | |
| 2007/0119762 A1* | 5/2007 | Shao | C02F 1/444 210/198.1 |
| 2007/0163943 A1* | 7/2007 | Collins | C02F 1/002 210/335 |
| 2008/0105618 A1* | 5/2008 | Beckius | C02F 1/002 210/650 |
| 2008/0272050 A1 | 11/2008 | Butters et al. | |
| 2010/0044321 A1* | 2/2010 | Vestergaard Frandsen | C02F 1/002 210/754 |
| 2010/0209294 A1 | 8/2010 | Owen et al. | |
| 2011/0305603 A1 | 12/2011 | Flick | |

FOREIGN PATENT DOCUMENTS

| | | |
|---|---|---|
| JP | 2000015065 A | 1/2000 |
| JP | 2000336702 A | 12/2000 |
| JP | 2000343075 A | 12/2000 |
| JP | 2002052386 A | 2/2002 |
| KR | 100791422 B1 | 1/2008 |
| WO | 2004101442 A1 | 11/2004 |
| WO | 2012012766 A2 | 1/2012 |

* cited by examiner

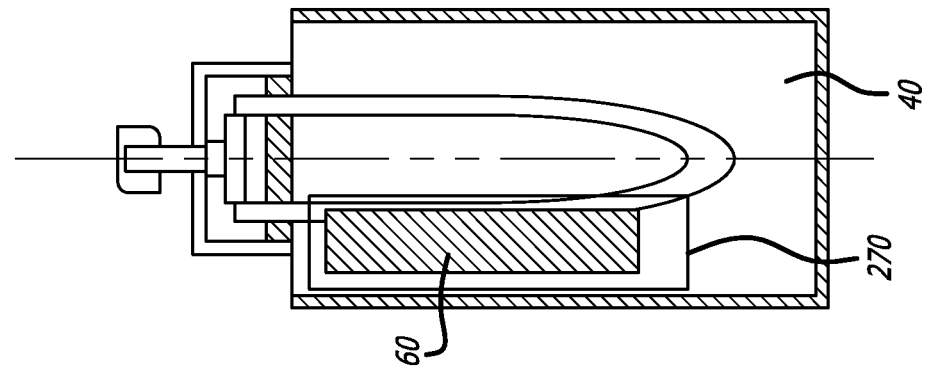
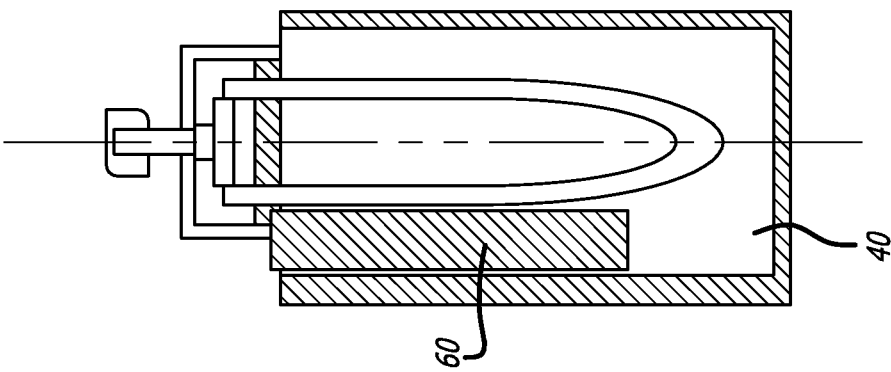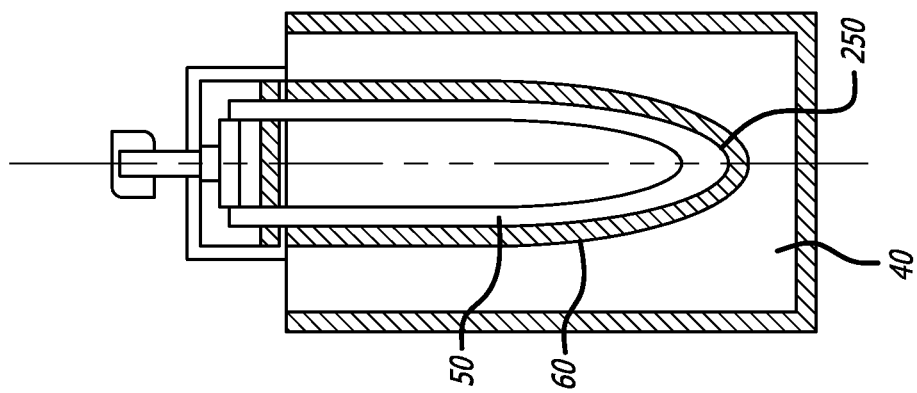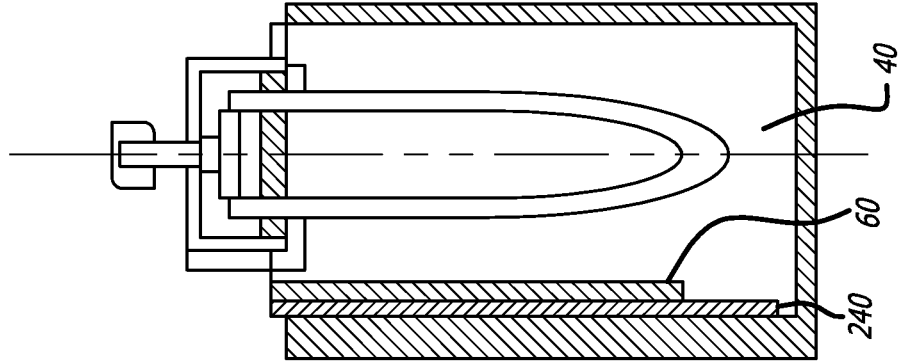

DISINFECTING WATER DEVICE

CROSS REFERENCE TO RELATED APPLICATIONS

The present application claims the benefit of U.S. Provisional Patent Application 61/735,473 filed Dec. 10, 2012, the entire contents of which is incorporated by reference herein.

BACKGROUND

Field

Some embodiments are related to fluid containers, e.g., bottles, which provide disinfected fluids for consumption.

Description of the Related Art

Several methods and devices have been proposed for the cleansing of a feed fluid to make it potable, that is suitable, for drinking. However, these options are either not reasonably portable, or when portable, do not have a mechanism to quickly make the water potable and to keep the container cleansed of microbes. Thus there is a need for a potable water device that is portable, fast acting, has a self-cleansing mechanism, and can be used more than once.

SUMMARY

The present embodiments relate to a device useful for providing potable water from a potentially non-potable feed water/feed fluid source. The device provides for instant removal of particulate and microbiological materials from the water while providing additional disinfection to the feed or filtered fluid and to the internal components of the device. In some embodiments, the device effects the substantial destruction of microbiological metabolites in the provided feed fluid, including odor and/or taste altering organic molecules; the substantial destruction of microbiological entities, e.g., viruses, protozoa, prions, fungi, and/or bacteria, algae; the substantial destruction of fragments of microbiological or biological entities; the substantial removal of endotoxins, and/or the substantial removal of materials between about 0.1 nm to about 100 μm in size.

Some embodiments include a device for producing a drinkable aqueous liquid from feed liquid comprising: a first fluid reservoir for receiving an aqueous feed liquid; a filter, in fluid communication with both the first fluid reservoir and a second fluid reservoir; wherein the filter is configured to size exclude undesired materials as the aqueous feed liquid passes from the first fluid reservoir to the second fluid reservoir, so that a sufficient amount of undesired materials are removed from the aqueous feed liquid to provide drinkable water to the second fluid reservoir by one pass of the aqueous feed liquid through the filter; and a disinfecting element disposed within the first fluid reservoir or the second fluid reservoir and contacting the water contained therein, wherein a sufficient amount of disinfecting element is present to disinfect a volume of aqueous feed liquid that is greater than the volume of the first fluid reservoir.

Some embodiments include a method of purifying an aqueous liquid, such as unpurified water, comprising passing the aqueous liquid through a filter of a device described herein. In some embodiments, the aqueous liquid is passed from the first fluid reservoir to the second fluid reservoir through the filter.

Some embodiments include a method for disinfecting a fluid, comprising the steps of: passing an unprocessed fluid from a first fluid reservoir through a filter having sufficient screening ability and flow rate into a second fluid reservoir and enabling access to the fluid contained within the second reservoir.

Some embodiments include a device for producing drinking water from a feed fluid, e.g., water, comprising a first fluid reservoir for receiving a feed fluid, e.g., water; and a filter in fluid communication with the first fluid reservoir and a second fluid reservoir, the filter comprising a filtration material, the filter defining a plurality of fluid pathways and having an average pore size sufficient to filter undesired pathogenic/mineral/organic materials from fluid passing therethrough at a minimum flow rate; and a first disinfecting element disposed within the first fluid reservoir and/or second fluid reservoir, and contacting the fluid contained therein, the disinfecting element disposed within an antimicrobially effective distance of the surface of the first fluid reservoir, second fluid reservoir, and/or filter, sufficient disinfecting element present to disinfect more feed fluid than the volume of the first fluid reservoir and/or the surface of the first fluid reservoir, second fluid reservoir, and/or filter; and a second fluid reservoir to receive purified feed fluid. In some embodiments, the first reservoir can be substantially refilled and the water treated multiple times, and/or the fluid contact surfaces within the first reservoir treated multiple times, and still retain the minimally desired disinfecting capability and flow rate across the filter and/or sufficient antifouling effect. In some embodiments, a selectively sealed exit conduit in fluid communication with the filter is provided to access the purified feed fluid from the filter. In some embodiments, a second disinfecting element is disposed within the second fluid reservoir and contacting the fluid contained therein.

These and other embodiments are described in greater detail below.

BRIEF DESCRIPTION OF THE DRAWINGS

FIGS. 4A-4D are schematics of embodiments of the disinfecting element described herein.

DETAILED DESCRIPTION

A device for producing drinking water can substantially reduce the presence of undesired materials in feed fluid, for example water, for use in portable drinking containers. In some embodiments, the fluid to be processed/disinfected/purified may include but is not limited to water, supplemented water, desirably flavored and/or taste-altered water, sports drinks, energy drinks, carbonated water based drinks, other hydrating fluids, and other water containing fluids for mammalian consumption.

Options for purify a feed fluid include applying UV or visible light radiation, filtration, and disinfecting materials. For example, device for purifying a fluid, e.g., producing drinking water, can include a first fluid reservoir that contains the feed fluid and a filter that is in fluid communication with the first fluid reservoir. In some embodiments, the device also includes a second fluid reservoir that is also in fluid communication with the filter. In some embodiments, the device can include a disinfecting element. In some embodiments, the disinfecting element can be present in the first fluid reservoir, the second fluid reservoir, or both.

Figure 1:
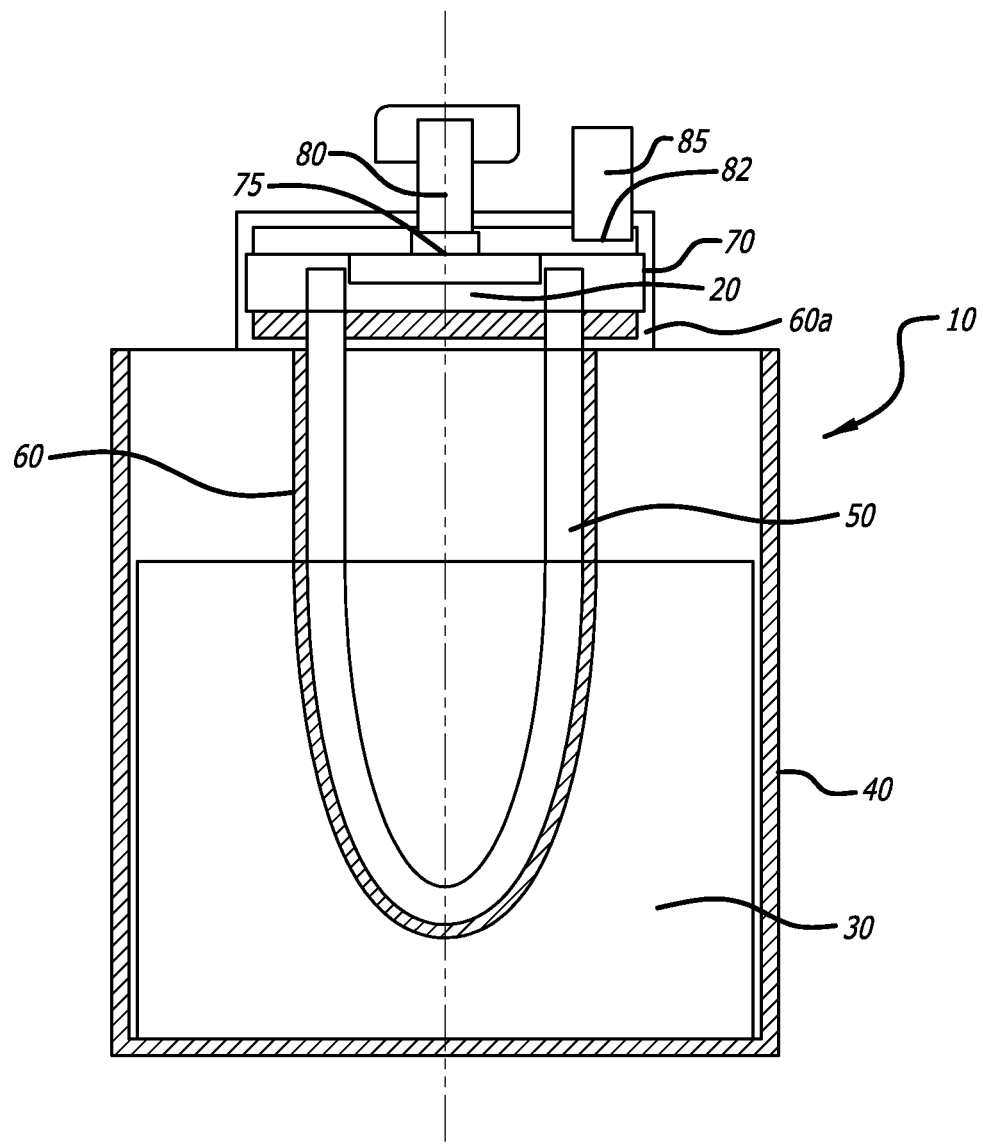
FIG. 1 is a schematic of an embodiment of a device described herein.
Figure 2:
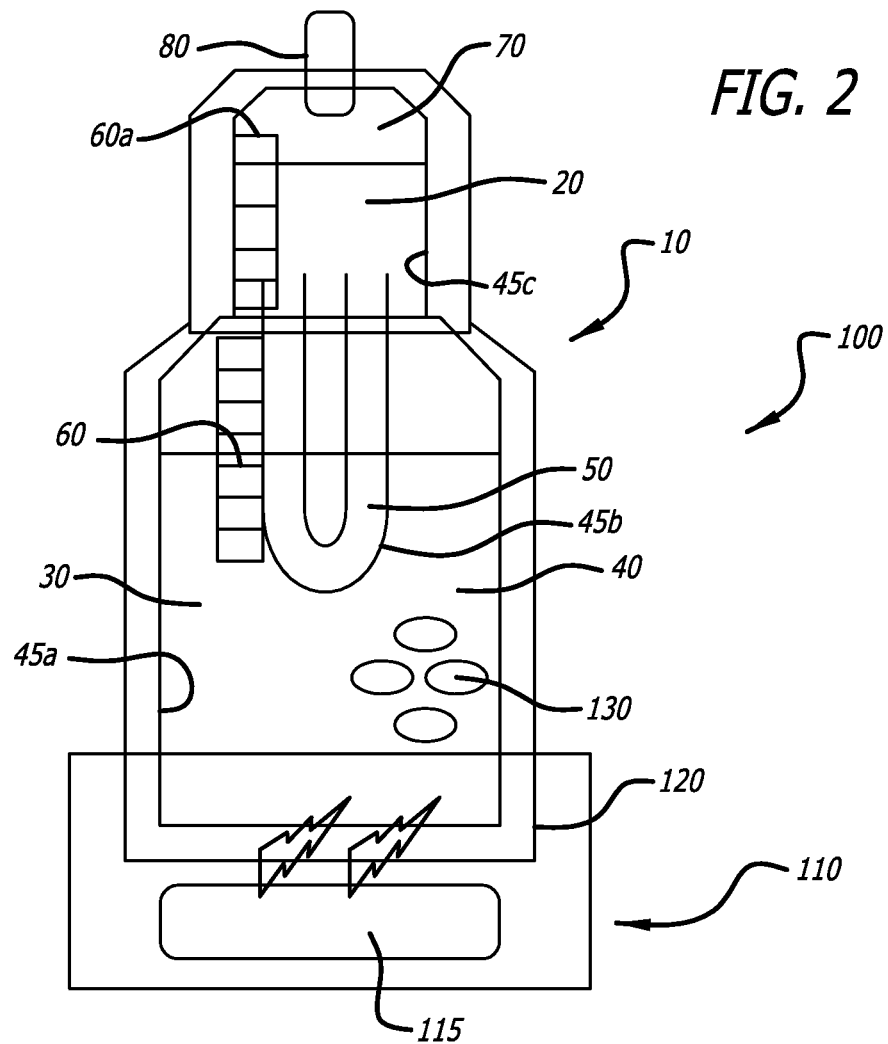
FIG. 2 is a schematic of an embodiment of a system including a light generating source and device described herein.

While a device including a first fluid reservoir, a filter, a second fluid reservoir, and a disinfecting element can have many different configurations, FIGS. 1 and 2 illustrate some possible embodiments of a device, such as device 10, for producing processed fluid or water 20, e.g., potable or drinking water, from a feed fluid or water 30 comprising a first fluid reservoir 40, having at least one fluid contact surface, for collecting the feed fluid or water; a filter 50, having at least one fluid contact surface, comprising a filtration material, the filter defining a plurality of openings having a size sufficient to remove or filter undesired materials from the fluid passing therethrough. In some embodiments, the removal is instantaneous. In some embodiments, the material is substantially removed with at most one pass through the filter 50, at a minimum and/or maximum flow rate. In some embodiments, a first disinfecting element 60 can be disposed within at least one of the fluid reservoirs and contacting the fluid contained therein with sufficient disinfecting element present to disinfect more feed fluid than the volume of the first fluid reservoir. In some embodiments, a second fluid reservoir 70 for collecting processed fluid or water is provided, the second fluid or water reservoir 70 in fluid communication with the filter 50 to receive the fluid 20. In some embodiments, the second fluid reservoir includes an exit opening 75 that is configured to allow fluid to be removed from the second fluid reservoir 70. The opening can be coupled to an exit lumen 80 through which the processed fluid can pass. A negative pressure can be applied to exit opening 75 or lumen 80 to induce the passage of the feed fluid across the filter 50. In some embodiments, the first fluid reservoir further includes an inlet opening 82 through which ambient gases can pass to enter the second fluid reservoir, which may help to improve flow of the processed fluid form the second fluid reservoir, e.g. through exit opening 75. Inlet opening 82 may be coupled to inlet lumen 85. In some embodiments, the disinfecting element 60 can be disposed as shown in FIG. 1, e.g., within the first fluid reservoir 40. In some embodiments, a second disinfecting element 60a can be disposed with the second fluid reservoir 70, and/or the second fluid reservoir can be optionally composed of substantially transparent material.

In some embodiments, the disinfecting element 60 can be disposed within an antimicrobially effective distance of a fluid contact surface 45 of the device, including a fluid contact surface 45a of the first fluid reservoir 40, a fluid contact surface 45c of the second fluid reservoir 70, and/or a fluid contact surface 45c of the filter 50. In some embodiments, the disinfecting element 60 can help to disinfect the fluid contact surfaces 45 of the device. In some embodiments, sufficient disinfecting element 60 is present to disinfect the fluid contact surfaces 45 of the device for processing more feed fluid 20 than the volume of the first fluid reservoir 40. In some embodiments, sufficient disinfecting element 60 is present to disinfect the fluid contact surface 45b of the filter for processing more feed fluid 20 than the volume of the first fluid reservoir 40.

The first fluid reservoir can include any reservoir that is capable of holding a fluid until it passes through the filter. In some embodiments, a first fluid reservoir comprises substantially fluid impermeable material. In some embodiments, a first fluid reservoir, such as first fluid reservoir 40, comprises substantially transparent material. The material can be sufficiently transparent to enable the minimally required amount of activating electromagnetic emissions to affect the desired level of disinfection within the desired time of exposure. In some embodiments, the first fluid reservoir is substantially transparent to visible light. For example, the material of the first fluid reservoir allows at least about 70%, at least about 90%, or at least about 95% of unreflected visible light to pass through the material. In some embodiments, the first fluid reservoir is substantially opaque to ultraviolet light. For example, the material of the first fluid reservoir may block at least about 70%, at least about 90%, or at least about 95% of ultraviolet light.

In some embodiments, the first fluid reservoir can be made of glass, plastic, polymeric material. Potentially suitable polymeric materials for constructing the respective reservoir include, but are not limited to, low-density polyethylene, low-density linear polyethylene, high-density polyethylene, polypropylene, polyolephins, polyethylene teraphthalates (PET), oriented polyethylene teraphthalates, polyvinyl fluoride, polyamides, polyarylsulfones, polyphthalamides, polysulfones, polyphenylsulfones, polyethersulfones (PES), aliphatic polyketones, polyfluorocarbons, polybutadienes, polybutylene teraphthalates, polyesters, polyethylene teraphthalates, polyphenylene ethers, polyphenylene oxides, polyphenylene sulfides, polyphthalate carbonates, polypropylenes, polystyrenes, polyurethanes, polyvinyl chlorides. Thermoplastics are typically used due to their recyclability. However, one skilled in the art will appreciate that various polymeric construction materials may be used to achieve a specific requirement.

The first fluid reservoir can include any reservoir that is capable of holding a fluid until it passes through the filter. In some embodiments, the first fluid reservoir can have a volume in the range of about 0.1 ounces to about 64,000 ounces (500 gallons). In some embodiments, the first fluid reservoir can have a volume of about 0.1 ounces, about 0.2 ounces, about 0.3 ounces, about 0.4 ounces, about 0.5 ounces, about 1 ounce, about 2 ounces, about 3 ounces, about 4 ounces, about 5 ounces, about 10 ounces, about 15 ounces, about 20 ounces, about 25 ounces, about 30 ounces, about 35 ounces, about 40 ounces, about 45 ounces, about 50 ounces, about 100 ounces, about 200 ounces, about 300 ounces, about 400 ounces, about 500 ounces, about 1,000 ounces, about 2,000 ounces, about 3,000 ounces, about 4,000 ounces, about 5,000 ounces, about 10,000 ounces, about 20,000 ounces, about 30,000 ounces, about 40,000 ounces, about 50,000 ounces, or a volume in a range bounded any of the aforementioned values, up to about 64,000 ounces (500 gallons). In some embodiments, the first fluid reservoir can be substantially larger than 500 gallons, but have partitions dividing the whole into segments of approximately 500 gallons each.

Some embodiments include a second fluid reservoir for receipt of the processed fluid selectively passing through the filter from the interior of the first fluid reservoir. In some embodiments, the second fluid reservoir can be any volume positioned so that a fluid flowing from the first fluid reservoir to the second reservoir will need to pass through to the filter. In some embodiments, the second fluid reservoir may be in fluid communication with the exterior environment. In some embodiments, the second fluid reservoir can comprise substantially transparent material as described with respect to the first fluid reservoir to enable disinfection while using selected visible light/UV light. In some embodiments, the transparency can be to visible light or UV radiation to enable additional processing and/or maintenance of treated or processed feed fluid. In some embodiments, the second fluid reservoir is substantially transparent to visible light. For example, the second fluid reservoir may be composed of material that allows at least about 70%, at least about 90%, or at least about 95% of unreflected visible light to pass through. In some embodiments, the second fluid reservoir is substantially opaque to ultraviolet light. For example, the material of the second fluid reservoir may block at least about 70%, at least about 90%, or at least about 95% of ultraviolet light.

In some embodiments, the first fluid reservoir and the second fluid reservoir are substantially transparent to visible light. For example, the first fluid reservoir and the second fluid reservoir may each be composed of a material that allows at least about 70%, at least about 90%, or at least about 95% of unreflected visible light to pass through. In some embodiments, the first fluid reservoir and the second fluid reservoir are substantially opaque to ultraviolet light. For example, the material of the first fluid reservoir and of the second fluid reservoir may block at least about 70%, at least about 90%, or at least about 95% of ultraviolet light.

In another embodiment, the second reservoir can be composed of substantially opaque or translucent material to minimize exposure to radiation that may increase the growth of residual materials that may be able to pass through the filter. In some embodiments, the substantially transparent or translucent material substantially block at least about 75% of the wavelength radiation that enables biological growth, e.g., visible light wavelengths (400-800 nm). In some embodiments, the substantially transparent or translucent material substantially transmit at least about 5%, more preferably at least about 25%, and most preferably at least about 50% of the wavelength radiation that enables photocatalysis, e.g., UV light or visible light wavelengths (160-400 nm and 400-800 nm respectively).

In some embodiments, the first fluid reservoir and second fluid reservoir are resealingly engaged to enable disengagement of one from the other, insertion of feed fluid into the first fluid reservoir and reengagement of the first and second fluid reservoirs in fluid isolation from each other's interior, thus maintaining the separation of the feed fluid from the processed fluid. In some embodiments, the first and second fluid reservoirs are threadingly engaged. In some embodiments, the first and second fluid reservoirs are snap fit engaged. In these embodiments, the engagements are sufficient to isolate the interiors of the reservoirs and the fluids contained therein from the environment and thus minimize contamination. The engagements are also sufficient to isolate the fluid in the second fluid reservoir from the first unless it passes through the filter.

The device can also include a second fluid reservoir capable of holding a fluid after the fluid has passed through the filter. In some embodiments, the second fluid reservoir can have a volume in the range of about 0.1 ounces to about 64,000 ounces (500 gallons). In some embodiments, the first fluid reservoir can be about 0.1 ounces, about 0.2 ounces, about 0.3 ounces, about 0.4 ounces, about 0.5 ounces, about 1 ounce, about 2 ounces, about 3 ounces, about 4 ounces, about 5 ounces, about 10 ounces, about 15 ounces, about 20 ounces, about 25 ounces, about 30 ounces, about 35 ounces, about 40 ounces, about 45 ounces, about 50 ounces, about 100 ounces, about 200 ounces, about 300 ounces, about 400 ounces, about 500 ounces, about 1,000 ounces, about 2,000 ounces, about 3,000 ounces, about 4,000 ounces, about 5,000 ounces, about 10,000 ounces, about 20,000 ounces, about 30,000 ounces, about 40,000 ounces, about 50,000 ounces, or any volume that is a combination of any of the aforementioned ranges, up to about 64,000 ounces (500 gallons). In some embodiments, the second fluid reservoir can be substantially larger than 500 gallons, but have partitions dividing the whole into segments of approximately 500 gallons each. In some embodiments, the second fluid reservoir can be the volume of a fluid conduit.

In some embodiments, the first fluid reservoir and second fluid reservoir are resealingly engaged to enable selective disengagement of one from the other, the insertion of feed fluid into the first fluid reservoir and reengagement of the first and second fluid reservoirs in fluidly separated modules. In some embodiments, the first and second fluid reservoirs are threadingly engaged. In some embodiments, the first and second fluid reservoirs are snap-fit engaged. In these embodiments, the engagements are sufficient to isolate the interiors of the reservoirs and the fluids contained therein from the environment and thus minimize contamination, and/or also isolate the water in the second fluid reservoir from the first unless it passes through the filter.

The device can also include a filter. Any suitable filter may be used that is configured to size exclude undesired materials from a feed fluid that passes through the filter. To size exclude refers to the ability to remove any material on the basis of the size of the material, such as by molecular size, e.g., the molecular length, width, depth, diameter, or weight. In some embodiments, the filter may remove a material on the basis of the material being too large to pass through a filter having pores that have a diameter of about 0.1 nm, about 0.3 nm, about 0.5 nm, or about 1 nm in diameter, or about 100 nm, or about 1 micron, or about 10 microns, or about 100 microns. In some embodiments, the filter has pores about 0.1 nm in diameter, about 0.2 nm in diameter, about 0.3 nm in diameter, about 0.4 nm in diameter, about 0.5 nm in diameter, about 0.6 nm in diameter, about 0.7 nm in diameter, about 0.8 nm in diameter, about 0.9 nm in diameter, about 1 nm in diameter, about 2 nm in diameter, about 3 nm in diameter, about 4 nm in diameter, about 5 nm in diameter, about 6 nm in diameter, about 7 nm in diameter, about 8 nm in diameter, about 9 nm in diameter, about 10 nm in diameter, about 20 nm in diameter, about 30 nm in diameter, about 40 nm in diameter, about 50 nm in diameter, about 60 nm in diameter, about 70 nm in diameter, about 80 nm in diameter, about 90 nm in diameter, about 100 nm in diameter, about 200 nm in diameter, about 300 nm in diameter, about 400 nm in diameter, about 500 nm in diameter, about 1 micron in diameter, about 2 microns in diameter, about 3 microns in diameter, about 4 microns in diameter, about 5 microns in diameter, about 10 microns in diameter, about 20 microns in diameter, about 30 microns in diameter, about 40 microns in diameter, about 50 microns in diameter, about 60 microns in diameter, about 70 microns in diameter, about 80 microns in diameter, about 90 microns in diameter, about 100 microns in diameter. In some embodiments, the filter can have pores having a diameter in a range bounded by, or between, any of these values.

In some embodiments, the filter can be configured so that a sufficient amount of undesired materials are removed from the aqueous feed liquid to provide drinkable water by one pass of the aqueous feed liquid through the filter.

Figure 7A:
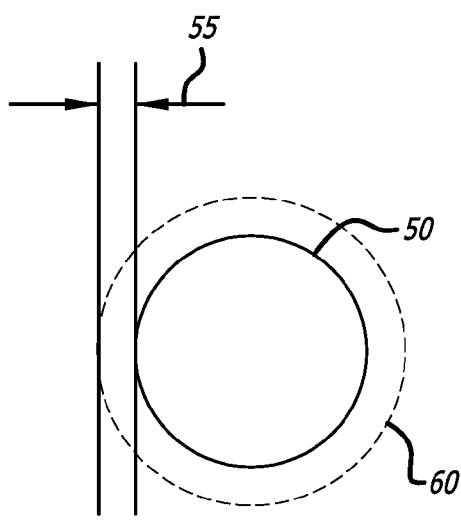
FIG. 7A-B show schematics of embodiments of the filter and disinfecting element described herein.
Figure 7B:
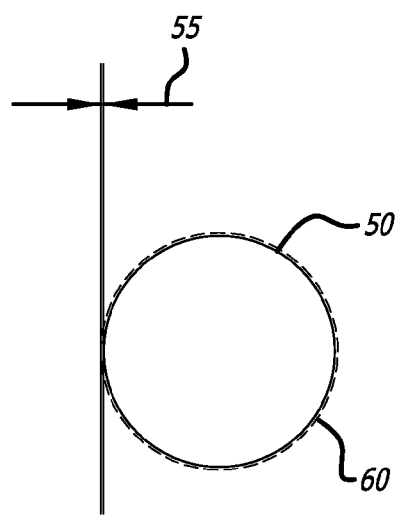

In some embodiments, the filter may comprise a hollow fiber, as discussed below. In some embodiments, the disinfecting element 60 may be wrapped around the filter 50 (FIG. 7A). In some embodiments, the distance between the disinfecting element and the wrapped filter is about less than about 0.1 µm, or less than about 0.01 µm (FIG. 7B).

In some embodiments, the filter can be a size-excluding filter. In some embodiments, the filter can be a size-excluding filter in the shape of a hollow fiber. In some embodiments, the hollow fiber can filter by size excluding undesired materials from a feed fluid that passes through the filter. In some embodiments, the size excluding hollow fiber filter comprises a polymer. In some embodiments, the size excluding hollow fiber filter further comprises a disinfecting element. In some embodiments, the fluid permeable size excluding hollow fiber filter comprises a polymer and a disinfecting element.

The fluid permeable size excluding hollow fiber polymer filter can be formed by concentrically concurrently dispensing, from a spinneret head, a dope solution into an inner core cavity and dispensing a lumen solution into an annular cavity. In some embodiments, two fluid dispensing means are attached to a spinneret head. In some embodiments, the first fluid dispensing means is attached to a first dispensing head, and the second fluid dispensing means is attached to a second dispensing head, the heads arranged such that the first dispensing head is an annular head that completely surrounds the second dispensing head. In some embodiments, the first fluid dispensing means can comprise a syringe. In some embodiments, the second fluid dispensing means can comprise a syringe. In some embodiments, the first and the second fluid dispensing means can comprise syringes.

In some embodiments, the first fluid dispensing means can dispense a dope solution. In some embodiments, the dope solution can comprise PES and N-methyl-2-pyrrolidone (NMP). In some embodiments, the dope solution can additionally comprise polyvinyl pyrrolidone (PVP) and/or a disinfecting element. In some embodiments, the dope solution can consist of 15-20 vol % PES, 0-5 vol % PVP, 0-5 vol % disinfecting element, and 70-85 vol % NMP.

In some embodiments, the second fluid dispensing means can be dispense a lumen solution, wherein the lumen solution defines the bore of the hollow fiber filter. In some embodiments, the lumen solution can comprise NMP or DMF, PVP, and water. In some embodiments, the lumen solution can comprise 0-40 vol % NMP, 0-5 vol % PVP, and 55-100 vol % water. In some embodiments, the lumen solution can comprise 0-40 vol % DMF, 0-5 vol % PVP, and 55-100 vol % water.

The hollow fiber filter can be formed by concurrently dispensing the dope solution and the lumen solution from the spinneret head while the spinneret head is disposed 1 inch to 10 feet above a water bath. The water in the water bath can be at a temperature between about 0° C. and 150° C.

As the solutions descend from the spinneret head into the water bath, the dope solution polymerizes, forming a hollow fiber. The hollow fiber can be rinsed for about 1 minute to about 1 week. After rinsing, the fiber can exit the water bath and be collected. In some embodiments, the fiber can be collected on a bobbin. Once collected, the fiber can be dried. The fiber can be dried by allowing water to evaporate at room temperature overnight, or the rinsed fiber can be dried in an oven at a temperature of up to about 100° C. for at least one day, or the rinsed fiber can be dried by a combination of heating in an oven and drying at room temperature.

Some embodiments include a filter to size exclude undesired materials from passing therethrough. In some embodiments, the filter selectively filters the feed fluid passing from the first fluid reservoir. In some embodiments, the filter fluidly communicates the first fluid reservoir with the second fluid reservoir. In some embodiments, the filter can comprise ultrafiltration and/or microfiltration material. In some embodiments, the ultrafiltration and/or microfiltration material may be a membrane or film. In some embodiments, the filter comprises at least one or a plurality of elements 150 (FIG. 3), the elements having at least one side of the filter in fluid communication with said second fluid reservoir. In some embodiments, the plurality of partition elements 150 can comprise at least one or a plurality of tubular members, the tublular members having an enclosed end 160 disposed within the interior of the first fluid reservoir and defining an exit opening 170. In some embodiments, the filter can define a plurality of pores having a pore size or define a plurality of fluid pathways having a diameter sufficient to filter out particles between about 0.1 nm to about 100 µm, the quality of water passed therethrough of drinkable quality within one pass. In some embodiments, the quality of water passed therethrough satisfies at least one of the United States Environmental Protection Agency (EPA) standards for public drinking water (National Primary Drinking Water Regulations, EPA 816-F-09-004 May 2009). In some embodiments, the quality of water passed therethrough satisfies at least one of the United States EPA secondary standards for public drinking water (National Secondary Drinking Water Regulations, EPA 816-F-09-004 May 2009). In some embodiments, drinkable quality water complies with at least 25%, 50%, 75%, 90%, 99% of the United States EPA standards for thermotolerant coliform bacterial levels. In some embodiments, drinkable quality water complies with at least 25%, 50%, 75%, 90%, 99% of the United States EPA standards for the presence or absence of *Escherichia coli* (*E. coli*) levels. In some embodiments, drinkable quality water complies with at least at least 25%, 50%, 75%, 90%, 99% of the World Health Organization (WHO) standards for thermotolerant coliform bacterial levels. In some embodiments, drinkable quality water complies with at least at least 25%, 50%, 75%, 90%, 99% of the WHO standards for the presence or absence of *E. coli* levels. In some embodiments, the filter comprises material that passes the fluid therethrough yet restricts or minimizes passage of undesired materials therethrough. Those minimized materials include materials that will not pass through a hole having a diameter greater than about 1 nm, about 2 nm, about 5 nm, about 10 nm, about 50 nm, about 100 nm, about 1 micron, about 10 microns, about 50 microns, about 75 microns, and/or 100 microns in any dimension. In some embodiments, the filter provides substantial removal of materials that will not pass through a hole having a diameter of about 0.1 nm and will pass through a hole having a diameter of about 100 microns. In some embodiments, the partition provides at least 75%, 80%, 90%, 95%, 97%, 99%, 99.9%, 99.99%, 99.999%, 99.9999%, 99.99999%, and/or 99.999999% removal of materials. Some materials that are preferably excluded include, but are not limited to inorganic particulate matter, organic particulate matter, biological metabolites, organic molecules that undesirably alter the taste and/or odor of the fluid, and/or biological materials or fragments thereof. In some embodiments, biological metabolites include, but are not limited to those produced by cyanobacteria (blue-green algae) and actinobacteria. In some embodiments, the cyanobacteria can be Anabaena. In some embodiments, the biological metabolites are released when the microbes die. In some embodiments, the biological metabolites are released when the microbes are functional. In some embodiments, the biological metabolites include, but are not limited to geosmin and 2-methylsioborneol. See Lawton, L., et al, "Destruction of 2-methylisobroneol and geosmin using titanium dioxide photocatalysts. Applied Catalysis B: Environmental. 44: 9-13 (2003)):

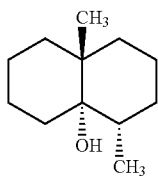
(4S,4aS,8aR)-4,8a-dimethyl-1,2,3,4,5,6,7,8-octaydronaphthalen-4a-ol (geosmin)

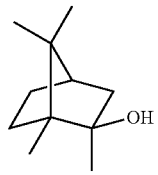
1,6,7,7-Tetramethylbicyclo [2.2.1]heptan-6-ol (2-methylisoborneol [2MIB])

In some embodiments, biological materials that are preferably excluded include, but are not limited to viral, bacterial, protozoan, fungal, prion entities, e.g., *E. coli, Staphylococcus aureus, Clostridium difficile, Cryptosporidium, Giardia, Legionella*, viruses (enteric).

In some embodiments, the filter fluidly communicates the first fluid reservoir with the second fluid reservoir and size excludes undesired materials from passing therethrough. In some embodiments, the filter provides a physical barrier to undesired materials in the feed fluid while enabling the passage of processed fluid, substantially without the undesired material described herein. In some embodiments, the filter comprises a flexible portion. In some embodiments, the filter comprises an inflexible portion. In some embodiments, the inflexible portion can deflect laterally a maximum of 50%, 40%, 25%, 10%, 7%, 5%, 3%, 1%, and or less than 0.05% of the elements longitudinal parameter. For example, if the inflexible portion is 10 mm in length, the maximum lateral deflection would be about maximum of 50%, 40%, 25%, 10%, 7%, 5%, 3%, 1%, and or less than 0.05% of 10 mm. In some embodiments, the filter has a desired flow rate. In some embodiments, the filter may comprise ultrafiltration material. In some embodiments, the filter exhibits a flow rate of at least about 0.001 liters/min to about 0.1 liters/min; about 0.005 liters/min to about 0.075 liters/min; and/or about 0.01 liters/min to about 0.05 liters/min, for example at least about 0.005 liters/min., 0.01 liters/minute, 0.02 liters/min, 0.05 liters/min, about 0.1 liters/min, about 0.5 liters/min and/or about 1.0 liters/min. In some embodiments, the filter exhibits a flow rate in a range bounded by, or between, any previously recited flow rates. In some embodiments, the filter may comprise an ultrafiltration material. In some embodiments, the filter is characterized by a molecular weight cut off (MWCO) of at least 70%, 75%, 80%, 85%, 90%, 95%, 97% 99% of material having a molecular weight of 5000-200,000 Daltons. In some embodiments, the ultrafiltration material or a membrane composed of such material may have an average pore size or fluid passageways having an average diameter of between about 0.01 µm (10 nm) to about 0.1 µm (100 nm), and/or between about 0.01 µm (10 nm) to about 0.05 µm (50 nm). In some embodiments, the membrane surface area is between about 0.01 m², 0.05 m², 0.10 m², 0.25 m², 0.35 m², to about 0.50 m², 0.60 m², 0.70 m², 0.75 m², 1.00 m², 1.50 m² to about 2.50 m², or any area in a range bounded by, or between, any of the recited areas. In some embodiments, the membrane surface area is about at least 50 m². In some embodiments, the filter member provides at least 99%, 99.9%, 99.99%, and/or 99.999% reduction in viruses, at least 99.9% 99.99%, and/or 99.999% reduction in protozoan populations, and/or at least 99.9%, 99.99%, and/or 99.999% reduction in bacterial populations in terms of mechanical screening ability.

Figure 3:
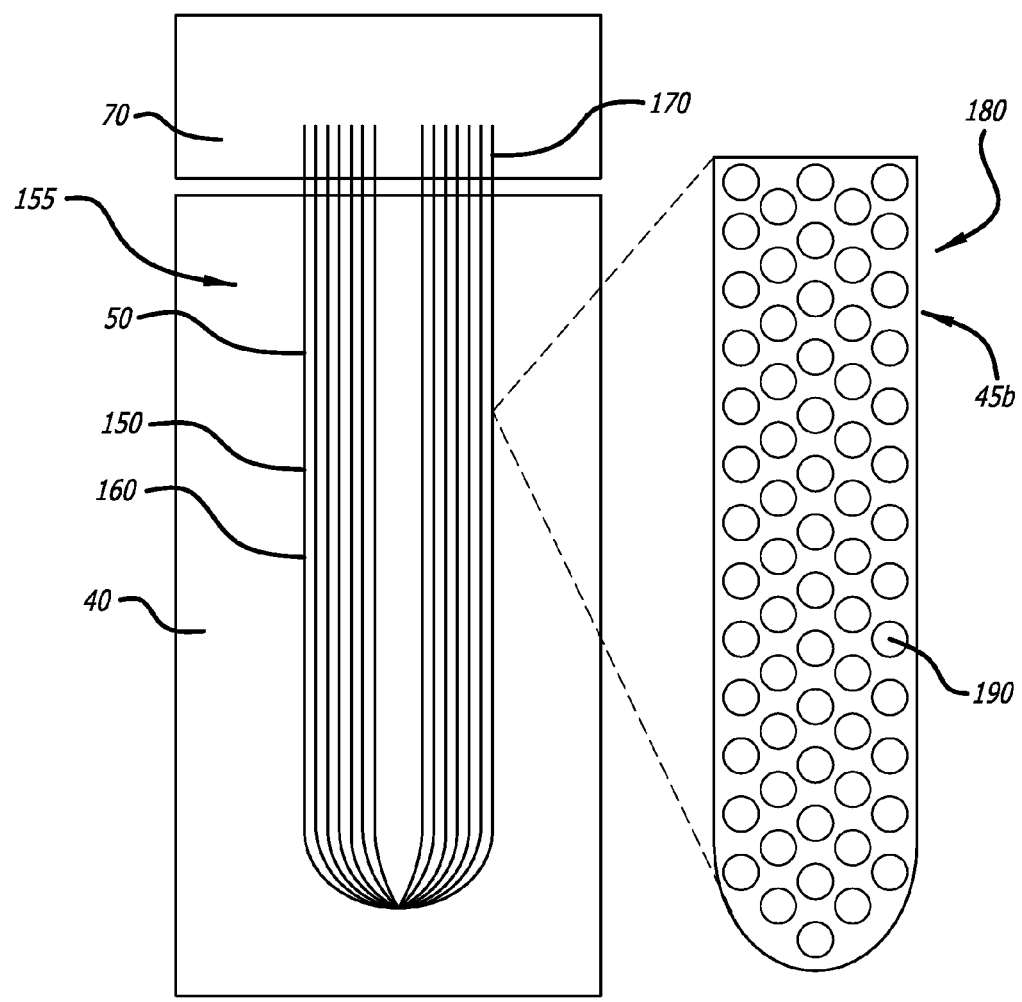
FIG. 3 is a schematic of an embodiment of the filter described herein.

As shown in FIG. 3, in some embodiments, the filter is a replaceable module 155 in sealable engagement with the first and or second fluid reservoirs. In some embodiments, as shown in FIG. 3, the filter 50 comprises at least one or a plurality of partition elements 150. In some embodiments, the partition element can be a hollow fiber or a plurality of hollow fibers extending into the first filter reservoir 40. In some embodiments, the hollow fiber[s] extend from the interior of the first fluid reservoir 40 and into the second fluid reservoir 70 to selectively fluidly communicate the interiors of the first and second fluid reservoirs. "Selectively fluidly communicates" describes the allowance of passage of the fluid therethrough while substantially denying the passage of sized materials, e.g., inorganic particulate matter, biological metabolites, organic materials and/or biological materials, therethrough. In some embodiments, the partition has surface[s] 160 in contact with the interior of the first fluid reservoir and defining at least one exit aperture 170 opening in the second fluid reservoir 70. In some embodiments, the hollow fibers are U-shaped. In some embodiments, the filter defines at least two exit apertures 170 opening into the second fluid reservoir 70, wherein the U-shaped, unopened portion 160 communicating the two exit apertures 170, extends into the first fluid reservoir 40. In some embodiments, additional structures are formed or disposed on the surface of the partition element to increase the contact area of the photocatalytic material with the respective fluids. In some embodiments, the filter can comprise between about 1 hollow fiber to about 10,000 hollow fibers, about 5 hollow fibers to about 5,000 hollow fibers, between 10 fibers to about 3500 fibers, between 10 fibers to about 2,000 fibers In one embodiments, the filter can comprise between about 1 hollow fiber to about 50 hollow fibers. In some embodiments, the number of fibers is sufficient to provide the desired size exclusion while maintaining the desired fluid flow across the membrane.

In some embodiments, suitable materials useful for the filter or partition elements can be, but are not limited to thermoplastic halopolymers, e.g., polyvinyliden difluoride (PVDF); polyvinyl chloride (PVC), polyarylsulfones, polysulfones (PS), polyphenylsulfones, polyethersulfones (PES) and polyolefins, e.g., polyethylene and polypropylene. In some embodiments, the disinfecting element may be disposed on the outside (contacting aqueous feed liquid) surface of the partition elements. In some embodiments, the disinfecting element may be disposed within the partition elements, contacting the aqueous feed liquid as it passes therethrough.

As shown in FIG. 3, the filter 50 can further comprise a protective sheath 180, disposed around and/or enclosing or separating the partition elements 150 from the interior of the first fluid reservoir 40. The protective sheath 180 can define a plurality of apertures 190 therethrough, enabling passing the feed fluid 20 to the partition elements 150. In some embodiments, a disinfecting element may be disposed on the surface of the protective sheath 180.

In some embodiments, the filter collects contaminants contained in the feed fluid. In some embodiments, the filter collects contaminants contained in the feed fluid for the purpose of concentrating the contaminants so that the contaminants may be inoculated by the disinfecting element.

A first disinfecting element can include any material that is capable of disinfecting a volume of fluid that is at least the volume of the first fluid reservoir. The disinfecting element can be present in the first fluid reservoir, can be present in the second fluid reservoir, or can be present in both the first fluid reservoir and the second fluid reservoir. It may also be useful if the disinfecting element is of a size and/or form that can prevent it from passing through the filter. Additionally, the first disinfecting element should be of a size and form that allows it to be disposed within the first fluid reservoir or the second fluid reservoir.

The disinfecting element can be a catalytic element, can be a photocatalytic element, or the disinfecting element can be a combination of catalyst(s) and photocatalyst(s). In some embodiments the photocatalytic element comprises doped or undoped $TiO_x$, doped or undoped $WO_x$, doped or undoped, $SnO_x$, doped or undoped $Cu_xO$, doped or undoped $CeO_x$, doped or undoped ZnO, or any combination thereof. In some embodiments, the doped $TiO_x$ compound can be TiSn $(CNO)_2$ as described in U.S. patent application Ser. No. 13/741,191, filed Jan. 14, 2013 (United States Publication No. 2013/0192976, published Aug. 1, 2013) which is incorporated by reference in its entirety. In some embodiments, the photocatalytic compound can be a $Cu_xO$ loaded photocatalytic composite as described in U.S. patent application Ser. No. 13/840,859, filed Mar. 15, 2013; and/or U.S. Provisional Application 61/835,399, filed Jun. 14, 2013, which are incorporated by reference in their entirety. In some embodiments the photocatalytic compound comprises loaded $TiO_x$, loaded $WO_x$, loaded $SnO_x$, loaded $Cu_xO$, loaded $CeO_x$, loaded ZnO, or any combination thereof. In some embodiments the disinfecting element comprises, or is, a combination of $Cu_xO$ and $TiO_x$, such as $TiO_2$.

For any relevant structural representation, x is 1, 2, 3, 4, etc. In some embodiments, x is 1 or 2. In some embodiments, x is 1, 2, or 3. In some embodiments, x is 1, 2, 3, or 4.

In some embodiments a disinfecting element has photocatalytic activity primarily in the visible light region of the electromagnetic spectrum. This can be important because convenient transparent materials for the first fluid reservoir and the second fluid reservoir, such as glass and plastic, including recyclable plastics, can be opaque to UV, so that most UV radiation can be unable to reach the disinfecting element. Thus, a disinfecting element with photocatalytic activity primarily in the visible region of the spectrum can be more effective than a disinfecting activity with photocatalytic activity primarily in the ultraviolet region when the fluid reservoir that contains the disinfecting element, e.g. the first fluid reservoir or the second fluid reservoir, is composed of glass or plastic.

In some embodiments, at least about 50%, about 70%, about 90%, or about 95% of the antimicrobial activity of a photocatalytic disinfecting element is due to visible light photocatalysis.

In some embodiments, a disinfecting element is active in the visible light region of the electromagnetic spectrum such that the disinfecting element provides at least 50%, 60%, 70%, 80%, or 90% reduction in the viruses, protozoan populations, or bacterial populations when the disinfecting element is exposed to ambient light for about 16 hours under ambient light through a transparent PET container.

It can be desirable for a disinfecting element to be within an antimicrobially effective distance of a surface of an aqueous fluid purification device, such as a fluid contact surface of a filter or a surface of a wall of a reservoir. An antimicrobially effective distance is a distance within which the photocatalyst can disinfect a surface, either directly, or through a fluid contacting both the photocatalyst and the surface. In some embodiments, a disinfecting element provides at least 80%, 90%, 95%, 99%, 99.9%, 99.99%, and/or 99.999% reduction in the viruses, at least 80%, 90%, 95%, 99%, 99.9% 99.99%, and/or 99.999% reduction in protozoan populations, and/or at least 80%, 90%, 95%, 99%, 99.9%, 99.99%, and/or 99.999% reduction in bacterial populations in terms of photocatalytic disinfecting ability of the surface of interest. In some embodiments, a disinfecting element, substantially prevents the accumulation of algae, microbes, and other organic material that may begin to accumulate on a fluid contact surface of the device. In some embodiments, the disinfecting element, completely prevents the accumulation of algae, microbes, and other organic material that may begin to accumulate on a fluid contact surface of the device. In some embodiments, a disinfecting element prevents the accumulation of algae, microbes, and other organic material that may begin to accumulate on a fluid contact surface of the device by destroying any such material or organism.

In some embodiments, an antimicrobially effective distance may be less than about 300 μm, about 200 μm, about 160 μm, about 150 μm, about 100 μm, about 80 μm, about 10 μm, about 1 μm, or about 0.1 μm. In some embodiments, the disinfecting element may contact a surface of an aqueous fluid purification device, such as a fluid contact surface of a filter or a fluid contact surface of a wall of a reservoir.

A disinfecting element may be affixed to a surface of an aqueous fluid purification device, such as a fluid contact surface of a filter or a fluid contact surface of a wall of a reservoir. In some embodiments, the disinfecting element is affixed to a surface such that it is not freed from the surface by agitation. In some embodiments, the disinfecting element may be affixed to a surface such that the surface maintains at least about 50%, about 70%, or about 90% of its antimicrobial activity after about 10, about 100, or about 500 uses for water purification. In some embodiments, if a 2 inch×1 inch section of the surface is cut, placed in a bottle of tap water, shaken at about 250 rpm for about 3 hours or about 6 hours, and removed from the water, the 2 inch×1 inch section of the surface retains at least 90%, at least 95%, or at least 99% of its antimicrobial activity.

In some embodiments, a disinfecting element, such as disinfecting element 60, comprises copper and/or its compounds, silver and/or its compounds, e.g., silver dihydrogen citrate (SDC), trichosan, halogen releasing compounds, and selenium and/or its compounds. The term disinfect refers to reducing or inhibiting the viral, protozoan population and/or bacterial population, on a surface of the device, and/or causing the substantial destruction of microbiological entities, e.g., viruses, protozoa, prions, fungi, and/or bacteria, and can include the antifouling effect of preventing the accumulation of algae, microorganisms, and other organic material/compounds on the surfaces of the device, and destruction of algae, microorganisms, or other organic material/compounds that may accumulate thereon. In some embodiments, the disinfecting element can reduce or inhibit the population of spores. In some embodiments, the reduction or inhibition in populations of spores can be accomplished when the spores transform into bacteria to reproduce and the bacteria are destroyed.

Some embodiments include a potable drinking device comprising a first fluid reservoir for collecting potentially non-potable aqueous feed liquid, the first fluid reservoir optionally comprising substantially transparent material; a second fluid reservoir for collecting drinkable aqueous fluid, the second fluid reservoir defining an aperture for the passage of fluid therethrough; a filter to selectively fluidly communicate the first fluid reservoir with the second fluid reservoir, the filter may also comprise an ultrafiltration and/or a microfiltration material. In some embodiments, the filtration material may be a membrane. In some embodiments, the membrane may have at least one open end in fluid communication with said second fluidreservoir, filter defining pores or fluid passageways therein, the pores having a pore size, the fluid passageways having average diameters sufficient to filter out particles between about 0.1 nm to about 100 microns, the quality of fluid passed therethrough of drinkable quality, within one pass; a first catalytic and/or photocatalytic element disposed within said first fluid reservoir and contacting the fluid contained therein; and a second catalytic and/or photocatalytic element disposed within said second fluid reservoir and contacting the fluid contained therein. In some embodiments, the device can be a container.

As shown in FIG. 2, in some embodiments, the disinfecting element 60 is disposed within an antimicrobially effective distance 55 of a fluid contact surface 45 of the device 10, such as a fluid contact surface of the filter. A fluid contact surface includes, but is not limited to, a fluid contact surface 45a of the first fluid reservoir 40, a fluid contact surface 45b of filter 50, a fluid contact surface 45c of the second fluid reservoir 70. In some embodiments, the disinfecting element 60 may be included in, and form a part of, fluid contact surface 45 of the device 10. In some embodiments, the disinfecting element 60 may comprise a substrate. In some embodiments, the substrate can be a thermosetting polymer. In some embodiments, the substrate can be any of polyethelene, polypropylene, polyester, polystyrene, polyamide, polyimide, polysulfone, polyethersulfone (PES), polyacrylate, polyacrylonitrile, polycarbonate (PC), polymethyl methacrylate (PMMA), polyvinylchloride (PVC) and/or mixtures thereof. In some embodiments, the substrate can comprise a polyester. In some embodiments, the polyester can be, for example, polyethylene terephthalate (PET), polybutylene terephthalate (PBT), polyethylene naphthalate (PEN). In some embodiments the substrate can be silicon dioxide mesh, glass wool or yarn, or other water permeable materials known in the art. In some embodiments, the disinfecting element may be disposed within a first fluid reservoir, such as first fluid reservoir 40. In some embodiments, a plurality of disinfecting elements 60 may be disposed within a first fluid reservoir, such as first fluid reservoir 40. In some embodiments, the disinfecting element may be disposed within the second fluid reservoir. In some embodiments, a plurality of disinfecting elements may be disposed within the second fluid reservoir.

In some embodiments, the disinfecting element may be formed over and/or integral with a fluid contact surface of the device. In some embodiments, the disinfecting element may be formed as a layer on, contacting at least in part, the fluid contact surface of the device, e.g., by vapor deposition, either chemical vapor deposition (CVD) or physical vapor deposition (PVD); laminating, pressing, rolling, soaking, melting, gluing, sol-gel deposition, spin coating; dip coating; bar coating; slot coating; brush coating; sputtering; thermal spraying including flame spray, plasma spray (DC or RF); high velocity oxy-fuel spray (HVOF) atomic layer deposition (ALD); cold spraying or aerosol deposition. In another embodiment, the disinfecting element can be incorporated into a fluid contact surface of the first fluid reservoir, e.g., at least partially embedded within the surface. In some embodiments, disinfecting element may be integral with and for a substantial portion of a fluid contact surface of the first fluid reservoir by including disinfecting element in the production of the first fluid reservoir, e.g., disinfecting element may be included in the polymer solution used to form a thermoplastic reservoir. In some embodiments the disinfecting element may be applied by the process disclosed in U.S. Provisional Patent Application 61/899,423, filed on Nov. 4, 2013, and U.S. Provisional Patent Application 61/898,980, filed on Nov. 1, 2013, both of which are hereby incorporated by reference in their entireties.

In some embodiments, the disinfecting element can be incorporated into the surface of the substrate, e.g., at least partially embedded within the surface. In some embodiments, the disinfecting element can be added to the material from which a fluid reservoir of the device is to be formed, e.g., photocatalyst particles can be added to a polymer mixture from which a thermoplastic fluid reservoir is formed so that the photocatalyst particles are embedded within the reservoir itself.

Figure 9:
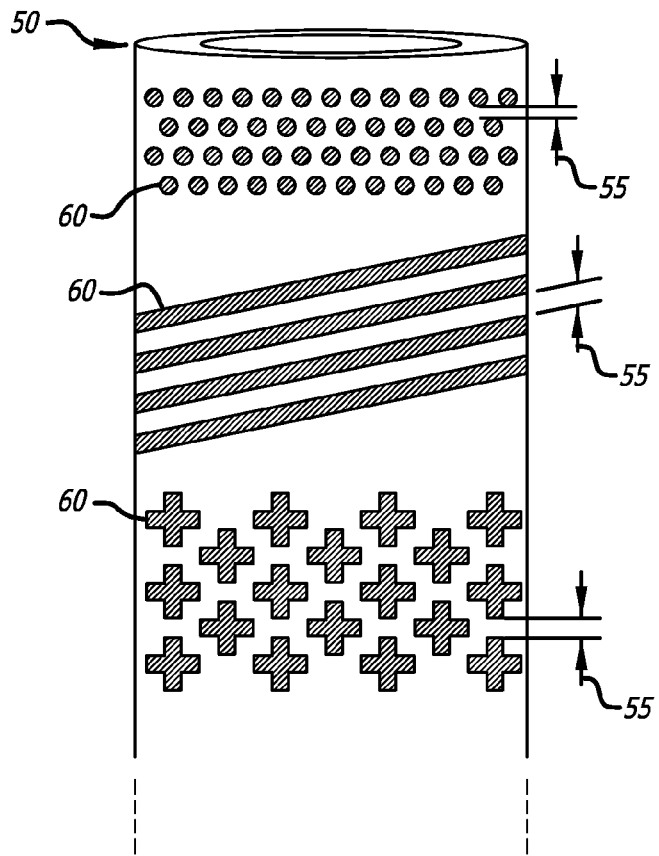
FIG. 9 is a schematic of an embodiment of the filter and disinfecting element described herein.

In some embodiments, the disinfecting element can be disposed on/within, or formed as a layer on, a fluid contact surface of the filter, in a discontinuous manner, such as stripes, dots, or other pattern (FIG. 9). The disinfecting element 60 may be disposed in a way such that the discontinuity, that is, the distance between stripes, dots, or other patterns, can stay within maximum an antimicrobially effective distance 55.

In some embodiments, wherein the disinfecting element is photocatalytic, the respective reservoir container may be optionally transparent. In some embodiments, there is sufficient disinfecting material to discourage and/or substantially eliminate biological growths, biological by-products, biological metabolites, or other similar materials from clogging the pores within the filter and substantially reduce the undesired biological or chemical materials within the feed fluid. In some embodiments, sufficient disinfecting element may be present to disinfect more feed fluid than the volume of the relevant fluid reservoir, at least 2 times, at least 3 times, at least 4 times, at least 5 times, at least 7 times, at least 10 times, at least 100 times, at least 500 times the volume of the relevant fluid reservoir and still retain the minimally desired disinfecting capability and flow rate across the filter. In some embodiments, the first disinfecting element 60 is disposed within or in fluid communication with the feed fluid received within the first reservoir. As shown in FIG. 4A, in some embodiments, the disinfecting material is affixed to a surface 240 within the first reservoir 40. In some embodiments, the disinfecting material is affixed by combustion loading. As shown in FIG. 4A, in some embodiments, the first reservoir has an interior surface 240, and wherein the first disinfecting element 60 is a coating disposed on the interior surface. As shown in FIG. 4B, in some embodiments, the filter 50 extends into the interior of the first fluid reservoir 40 and has an exterior surface 250, wherein the first photocatalytic element 60 is affixed, coated or otherwise disposed on the filter surface extending into the first fluid reservoir 40. As shown in FIG. 4C, in some embodiments, the device may further comprise a sheet or any other macroparticle structure comprising or consisting essentially of disinfecting material disposed within the interior of the first fluid reservoir 40. As shown in FIG. 4D, in some embodiments, the device may further comprise a translucent matrix 270, disposed within the interior of the first fluid reservoir 40, wherein the first disinfecting element is affixed, coated or otherwise disposed on the translucent matrix 270 in the first fluid reservoir. In some embodiments, the translucent matrix can be or be selected from one or more of the following: mesh, wool, yarn, textile, film, frit, and fiber made of at least one of glass, quartz, alumina, zirconia, ceria, titania or polymers and/or combinations thereof. In another embodiment, the disinfecting element can be a sheet or other shape substantially or consisting essentially of a disinfecting material. In some embodiments, the disinfecting element can be disposed in the interior of the first fluid reservoir, in fluid communication with the fluid contained therein. In some embodiments, the disinfecting element can be disposed in the interior of the first fluid reservoir, in contact with at least one, may be more, of the surfaces within the reservoir, e.g., the surface of the reservoir, the surface of the filter, fluid communication with the fluid contained therein.

Some embodiments include a second disinfecting element disposed within or in fluid communication with the fluid passing through the filter and received within the second fluid reservoir. Sufficient amounts of the disinfecting elements are disposed in the interior of the second fluid reservoir or otherwise disposed on the side of the filter distal from the first fluid reservoir to substantially reduce the biological, chemical or other residual materials remaining in the feed fluid which can pass through the filter.

In some embodiments, the disinfecting elements also substantially disinfect the surfaces on which they are disposed. In order to effectively disinfect the fluid contact surfaces of the device, the disinfecting element can be disposed near a fluid contact surface of the device. In some embodiments, the distance between the disinfecting element and the nearest fluid contact surface of the device is a antimicrobially effective distance. In some embodiments, the greatest distance between a fluid contact surface of the device and the nearest disinfecting element is an antimicrobially effective distance. In some embodiments, the distance between a filter and a disinfecting element can be about 0.1 microns to about 1000 microns. In some embodiments, the distance between a filter and the nearest disinfecting element can be about 10 microns to about 800 microns, about 20 microns to about 500 microns, about 50 microns to about 400 microns. In some embodiments, the distance between a filter and the nearest disinfecting element can be about 0.001 microns to about 80 microns. In some embodiments, the distance between a filter and the nearest disinfecting element is less than about 1 micron. In some embodiments, the distance between a filter and the nearest disinfecting element is less than about 1 micron. In some embodiments, a disinfecting element contacts a filter. In some embodiments, the distance between a filter and the nearest disinfecting element is about 80 microns, or 80 microns or less.

Figure 6A:
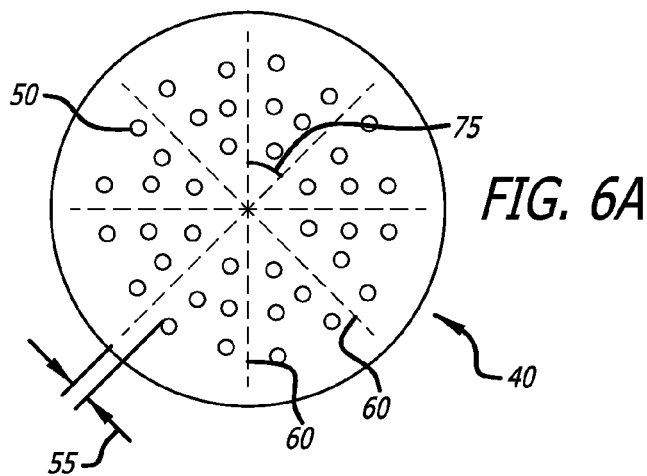
FIG. 6A-C shows schematic views of embodiments of the filter and disinfecting element.

In some embodiments, the disinfecting element can be disposed radially within at least one fluid reservoir. In some embodiments, a plurality of disinfecting elements can be disposed radially within at least one fluid reservoir (FIG. 6). In some embodiments, the radially disposed disinfecting elements 60 are evenly spaced around the at least one fluid reservoir, that is, the angle 75 between each of the radially disinfecting elements 60 is equal (FIG. 6A). In some embodiments, there are two radially disposed disinfecting elements 60, and the angle 75 between them is 180°. In some embodiments, there are three radially disposed disinfecting elements 60, and the angle 75 between them is 120°. In some embodiments, there are four radially disposed disinfecting elements 60, and the angle 75 between them is 90° (FIG. 6C) In some embodiments, there are five radially disposed disinfecting elements 60, and the angle 75 between them is 72°. In some embodiments, there are six radially disposed disinfecting elements 60, and the angle 75 between them is 60°. In some embodiments, there are seven radially disposed disinfecting elements 60, and the angle 75 between them is 51.43°. In some embodiments, there are eight radially disposed disinfecting elements 60, and the angle 75 between them is 45°. Those skilled in the art will recognize that a greater number of radial disposed disinfecting elements is possible, and an embodiment comprising n equally spaced radially disposed disinfecting elements will have an angle 75 of 360/n degrees between the radially disposed disinfecting elements.

In some embodiments, the disinfecting element may define a volume within the at least one fluid reservoir. In some embodiments, a plurality of disinfecting elements may be disposed within the at least one fluid reservoir. In some embodiments, a plurality of disinfecting elements may define a plurality of volumes within the at least one fluid reservoir. In some embodiments, the plurality of disinfecting elements may be concentrically disposed within the at least one fluid reservoir (FIG. 6B).

Figure 6B:
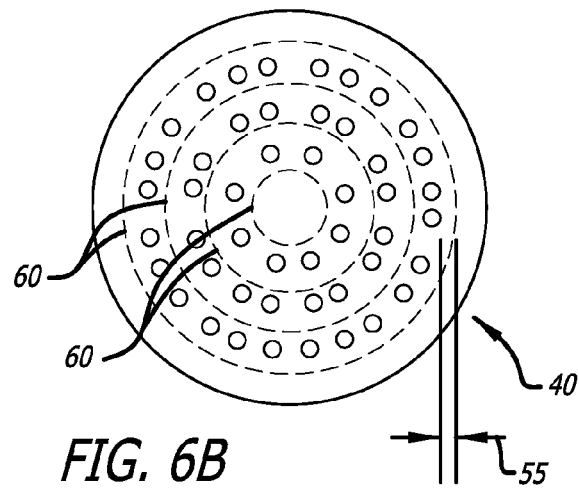
Figure 6C:
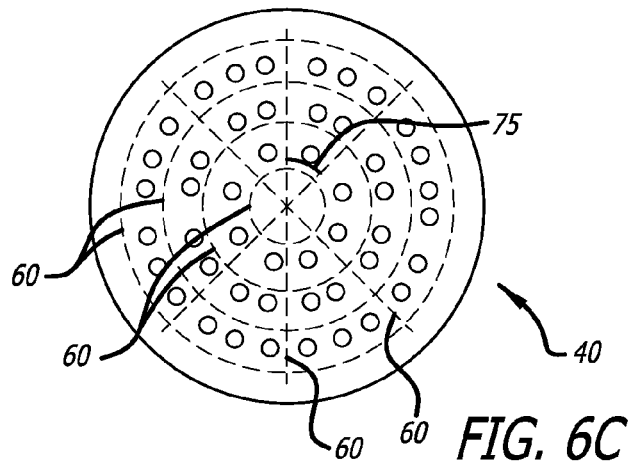

In some embodiments, the disinfecting element 60 can be disposed radially and concentrically (FIG. 6B).

In some embodiments, the feed fluid can be any consumable liquid for consumption by mammals. In some embodiments, the feed fluid is water. In some embodiments, the feed fluid can be, but is not limited to, ground water, river water, waste water, tap water, etc.

Some embodiments include a device wherein a partial vacuum applied to the exit opening induces the feed fluid to cross the filter. In an embodiment, the partial vacuum is created by the application of suction to the second fluid reservoir through an exit opening defined therein. In some embodiments, the application of less than about 5 negative psi, 4 negative psi, 2.5 negative psi, 2 negative psi, 1.0 negative psi, and/or 0.1 negative psi to the exit opening is sufficient to induce the fluid to cross the filter. In some embodiments, the negative suction is provided by human suction. In some embodiments, the negative suction is provided by non-human mechanical suction, e.g., a rubber bulb. In some embodiments, the application of increased pressure to the feed fluid contained within the first fluid reservoir induces the fluid to cross the filter. In some embodiments, either of the first or second fluid reservoirs are formed of deformable material such that deformation of the reservoir changes the pressure/relative pressure within the reservoirs and induces the fluid to cross the filter.

As shown in FIG. 2, Some embodiments include a water system 100 which further includes a disinfecting ultraviolet or visible light (UV/Vis) generation assembly 110 which may comprise a light source 115 in optical communication with the disinfecting element 60, the light source providing sufficient electromagnetic emission to disinfect the feed fluid 30 within the first fluid reservoir 40 and or the fluid within the second fluid reservoir 70. In some embodiments, the light from the light source 115 directly disinfects the fluid contact surface 45a of the first fluid reservoir 40, the feed fluid 30 contained within the first reservoir 40, or the fluid contact surface 45b of the filter. In some embodiments, the light from the light source 115 activates or engages the disinfecting element 60 to disinfect the fluid contact surface 45a of the first fluid reservoir 40, the feed fluid 30 contained within the first reservoir 40, or the fluid contact surface 45b of the filter. In some embodiments (not shown) the light source is disposed within the first and/or second fluid reservoirs. In some embodiments the light source 115 is disposed outside the first fluid reservoir 40. In some embodiments, the assembly 110 defines a receptacle 120 sized to receive the device 10 therein, and/or position the light source sufficiently close to the device 10 to affect the disinfecting element 60. In some embodiments, the light source 115 is flexible and can substantially entirely enclose the device 10 being disclosed herein. In some embodiments, the light source 115 may include at least one of a UV lamp, a fluorescent lamp, a light emitting diode (LED) or an organic light emitting diode (OLED). In some embodiments, the light source may be a material which emits light radiation upon excitation with electrons or nuclear or extra-nuclear radiation e.g. Beta particles or X-rays. In some embodiments, the disinfecting element includes a catalytic and/or a photocatalytic material. In some embodiments, the disinfecting elements may be one or more of alcohols, aldehydes, anilides, biguanides, diamidines, ethylene oxide, peracetic acid, halogen-releasing agents, silver compounds, copper compounds, peroxygens, hydrogen peroxide, phenols, bisphenols, halophenols, quaternary ammonium compounds and photocatalysts. In some embodiments, the disinfecting element may be an Ag-based compound or composite. In some embodiments, the disinfecting element may be a Cu-based compound or composite. In some embodiments, the disinfecting element may be a Se-based compound or composite. In some embodiments, the disinfecting elements may be at least one of triclosan, chlorhexidine, hydrogen peroxide, inorganic and organic peroxides, etc. In some embodiments, the light source provides between about 0.01 mW/cm$^2$ to about 100 W/cm$^2$ of electromagnetic radiation, preferably visible light (wavelength 400-800 nm) and/or UV radiation (wavelength 160-400 nm). The particular wavelength of light may be selected to activate or affect the photocatalytic material used, e.g., about 200 nm to about 600 nm when using $WO_3$. The particular wavelength of light used may be selected to directly disinfect the feed fluid, without requiring other catalytic or photocatalytic material. e.g., about 200 nm to about 600 nm.

In some embodiments, the light source is battery powered.

In some embodiments, an optional visual indicator 130 can be selectively inserted into the feed fluid 30/reservoir, e.g., first reservoir 40, containing the disinfecting agent 60 (FIG. 2). Exposure of the disinfecting element 60 to the light source 115 can degrade the visual indicator 130 to provide an indication of the continued disinfecting efficacy of the disinfecting element 60. In some embodiments, the disinfecting element 60 comprises a photocatalyst which can degrade the visual indicator 130 in the presence of activating electromagnetic radiation from light source 115 thereby indicating the continued disinfecting efficacy of 60. In some embodiments, the disinfecting element can degrade the visual indicator without any activation thereby indicating the continued disinfecting efficacy of the disinfecting elements. Suitable visual indicators include, but are not limited to, food additive dyes including anthocyanins (e.g. blackberry juice; 5 ml in about 1 liter of feed fluid). A suitable but not exhaustive list of such dyes can be found at http://www.fda.gov/forindustry/coloradditives/coloradditiveinventories/ucm115641.htm and is hereby incorporated in its entirety by reference.

Figure 5:
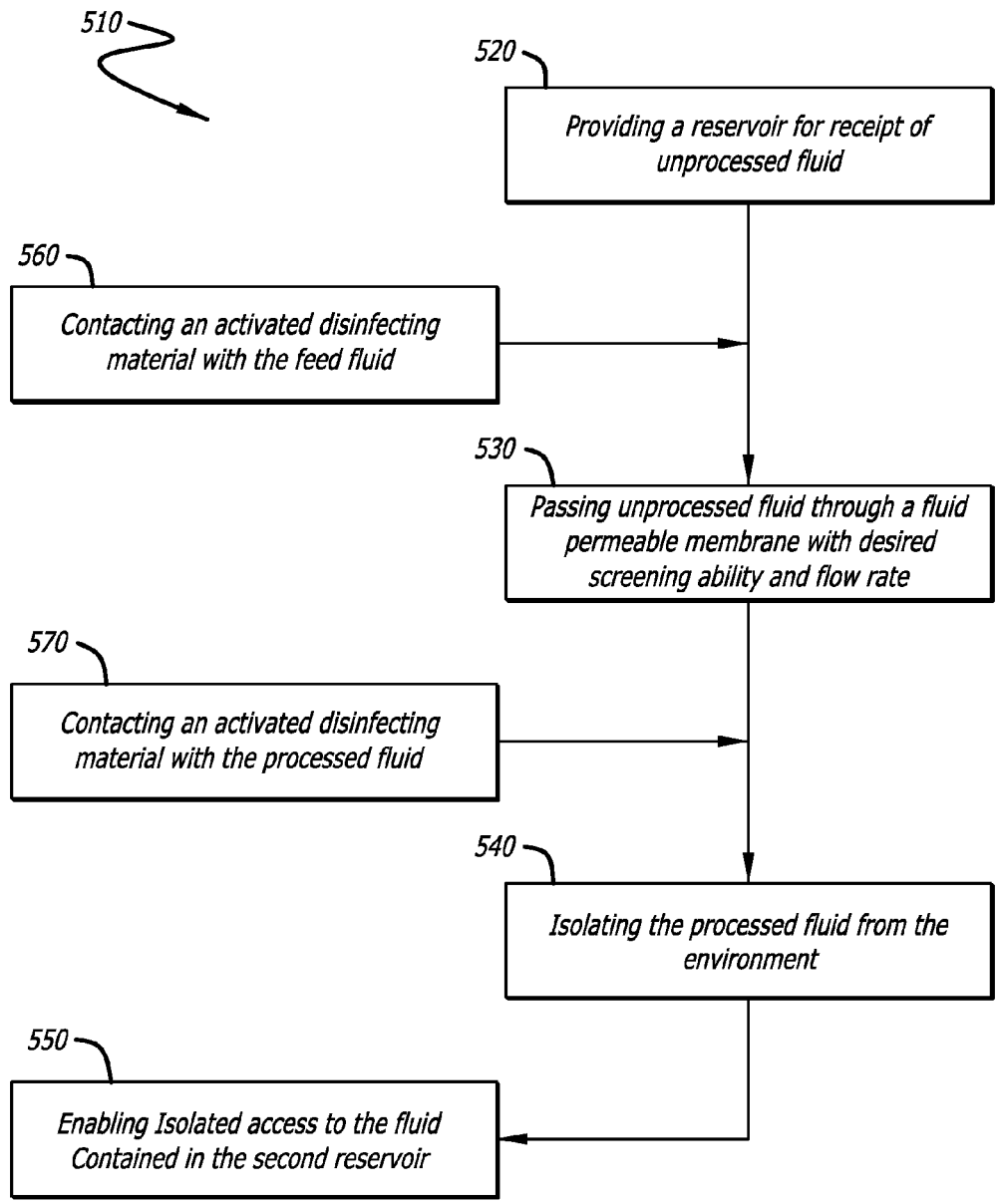
FIG. 5 is a flow chart of a method of producing drinking water.

In some embodiments such as the embodiment depicted in FIG. 5, a method S10 is described for disinfecting including the steps of providing a reservoir for receipt of unprocessed fluid S20; passing the unprocessed fluid through a filter having sufficient screening ability (substantially retain particles having greater than the described threshold sizes) and flow rate S30; isolating the processed fluid from the environment S40; and enabling isolated access to the fluid contained within the second reservoir S50. In some embodiments, the method further comprises contacting an activated disinfecting material with the feed fluid S60. In some embodiments, the method further comprises contacting an activated disinfecting material with the processed fluid S70. In some embodiments, the method further comprises selectively altering the pressure within the reservoirs to induce passing of the unprocessed fluid across the fluid permeable partition S80.

In some embodiments, it is desirable for the device to effectively disinfect the fluid contact surfaces of the device and/or fluid within the device during times of extended darkness with limited exposure to light, e.g., a pitcher stored in a refrigerator. In some embodiments, the fluid contact surfaces of the device include sufficient disinfecting element to effectively disinfect the fluid contact surfaces, and/or the fluid contained therein, with limited light exposure. In some embodiments, the disinfecting element can be effective when exposed to light for limited times and remains in darkness otherwise. In some embodiments, the disinfecting element can be effective when exposed to light for intervals as little as 1 second per week and as much as 168 hours per week (light exposure 24 hours per day). In some embodiments, the disinfecting element can effective when exposed to light for 1 second in a week, 2 seconds in a week, 3 seconds in a week, 4 seconds in a week, 5 seconds in a week, 10 second in a week, 20 seconds in a week, 30 seconds in a week, 40 seconds in a week, 50 seconds in a week, 1 minute in a week, 2 minutes in a week, 3 minutes in a week, 4 minutes in a week, 5 minutes in a week, 10 minute in a week, 20 minutes in a week, 30 minutes in a week, 40 minutes in a week, 50 minutes in a week, 1 hour in a week, 2 hours in a week, 3 hours in a week, 4 hours in a week, 5 hours in a week, 6, hours in a week, 7 hours in a week, 8 hours in a week, 9 hours in a week, 10 hours in a week, 20 hours in a week, 30 hours in a week, 40 hours in a week, 50 hours in a week, 60, hours in a week, 70 hours in a week, 80 hours in a week, 90 hours in a week, 100 hours in a week, or any exposure time in a range bounded by, or between, any of the aforementioned exposure times, up to 168 hours per week.

In some embodiments it is desirable for the device to effectively disinfect the fluid contact surfaces of the device and/or fluid within the device over a range of temperatures, e.g., a pitcher stored in a refrigerator. In some embodiments, the fluid contact surfaces of the device include sufficient disinfecting element to effectively disinfect the fluid contact surfaces, and/or the fluid contained therein, over a range of temperatures. In some embodiments, the disinfecting element can be effective over a temperature range from about −40° C. to about 100° C. In some embodiments, the disinfecting element can be effective at about −40° C., about −35° C., about −30° C., about −25° C., about −20° C., about −15°

C., about −10° C., about −5° C., about 0° C., about 5° C., about 10° C., about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., about 100° C., or any temperature within a range bounded by, or between, any of these values.

EXAMPLE 1

The photocatalytic powder was prepared in a similar manner to that described in United States Patent Publication 2013/0192976 (filed Jan. 14, 2013, published Aug. 1, 2013), which is incorporated by reference in its entirety.

TiSn(CNO)$_2$ powder (Ex-1): 3.78 g of Tin(II) 2-ethylhexanoate [also known as tin(II) octoate and/or stannous octoate] (Spectrum Chemicals, Gardena, Calif., USA) and 30 ml of a solution of 50 wt % titanium lactate (Tyzor LA) (Sigma Aldrich, St. Louis, Mo., USA), [15.0 g] of Ammonium nitrate (NH$_4$NO$_3$) (Sigma Aldrich, St. Louis, Mo., USA) were dissolved in about 25 ml of reverse osmosis (RO) water, then heated to about 150° C. and stirred for about 20 minutes.

The resultant precursor mixture was then heated at about 350° C. for about 40 minutes in a preheated muffle furnace under ambient atmosphere and pressure conditions. The resultant powder was then removed from the reaction vessel and placed in the preheated muffle furnace and then annealed at about 400° C. under ambient conditions for about 40 minutes.

EXAMPLE 2

Size-Exclusion Filter Preparation

Two feed syringes were attached to a spinneret head about 36 inches above a receiving tub of about 20° C. water. The first syringe was filled with a doped solution consisting of 20 vol % polyethersulfone (PES), 2 vol % polyvinylpyrrolidone (PVP), 2 vol % P25® (EvoniK Degussa, N.J., USA) loaded CuxO, and 76 vol % N-methyl-2-pyrrolidone (NMP). The second syringe was filled with a lumen solution consisting of 25 vol % NMP and 75 vol % water. The spinneret head directed the dope solution from the first syringe to be dispensed by a first head. The spinneret head directed the lumen solution from the second syringe to be dispensed from an internal head that was completely surrounded by the dope-solution dispensing head.

The plungers of the syringes were depressed, dispensing the solutions through the spinneret head, and the dope solution polymerized as the solutions descended into the water bath forming a membrane fiber. The fiber descended into the 20° C. water bath, where the membrane fiber was rinsed in deionized water for 5 minutes to 24 hours. After rinsing in the water bath, the fiber exited the water bath and was collected on a bobbin. The membrane fiber was then cut off the bobbin and dried for one hour in an oven at 50° C. and then dried overnight at the ambient room temperature to ensure complete drying.

After the membrane fiber was dried, it was potted into a module for evaluation.

EXAMPLE 3

Size-Exclusion Filter Evaluation Module Preparation

A size-exclusion filter module was made by the following process. A 1 foot length from a 1.5-inch diameter acrylic tube was cut, the ends were sanded, and tap-holes were drilled a short distance from the end of each tube to be used for connections during the potting process. Two 0.5-inch sections of 1.5-inch diameter acrylic tube were cut to be used as stacking sections during the potting process, and two 4-inch sections of 2 inch diameter acrylic tube were cut to be used as epoxy reservoirs during the potting process. Each section of acrylic tube had a tap-hole drilled to be used for connections during the potting process.

The fibers created as in Example 2 were laid out on a flat surface. The total number of fibers was determined by weighing a small number of fibers and calculating the number based on the aggregate weight of the fibers. Additionally, the effective surface area of membrane was calculated using the total number of fibers and the known dimensions of the fibers. The fibers were then collected into bundles and bound. One end of the bundled fibers was singed with an open flame to seal the fibers.

The 1 foot acrylic tube, with the membrane fibers inside, was placed on top of the 0.5" section of acrylic tube and the sections of tubing were taped together. The 4 inch reservoir section of acrylic tube was placed next to the stacked tube arrangement with the tap-hole for tubing connection at the bottom of the 4 inch section.

Epoxy was prepared for the potting process. The prepared epoxy was loaded into the 4 inch acrylic tube. The epoxy flows from the 4 inch acrylic tube into the stacked module arrangement according to Pascal's static fluid equilibrium principle. Once the epoxy had cured, the module unit was flipped over and the process repeated on the other end of the acrylic tube. After both ends of the module were potted and the epoxy had cured, end-caps were applied using PVC cement.

EXAMPLE 4

Reservoir Preparation, photocatalytic (CuxO/TiO$_2$) coating on polymer pitcher with silicone oligomer as binder The plural phasic TiO$_2$ was loaded onto CuxO in a manner described in U.S. patent application Ser. No. 13/840,859, (filed Mar. 15, 2013) and U.S. Provisional Patent Application 61/835,399 (filed Jun. 14, 2013 The weight fraction of copper to plural phasic TiO$_2$ (87% anatase phase TiO$_2$/13% rutile phase TiO$_2$ sold under the brand name P25® was 0.01 Aqueous solution (15 mL) of CuCl$_2$.2H$_2$O (26.8 mg) was stirred with 1 g of P25® at about 90° C. for 1 h. Then, 1.5 mL of aqueous solution containing NaOH (25 mg) and glucose (125 mg) was added to the reaction mixture at about 90° C. while stirring. After the addition of aqueous solution of glucose and NaOH, the mixture was stirred for about another 1 h, then cooled down to room temperature, followed by filtration through 0.05 micron membrane, washing with 100 to 150 mL DI water and finally dried it at 110° C. in air oven for about 2 h.

Photocatalytic coating comprising copper loaded titanium oxide on a water pitcher was implemented. The coating suspension consisted of P-cat (CuxO/P25®) powder dispersed in silicone oligomer (KR-500, ShinEtshu Silicones, Japan) and catalyst (D-25) of 2 wt % vs. KR-500 which was made by following the procedures above. The water pitcher made of PMMA was first coated with primer layer consisting of silane coupling agent for promoting the adhesion between PMMA and KR-500. The synthesis of silane coupling agent was listed as follows.

EXAMPLE 5

Silanization Procedure:

A mixture of 70:30 vol % ethanol and MiliQ™ (trademark of Millipore Corporation, MQ) water was prepared as a solvent for the silane reaction. From this, a 7.5 wt % solution of aminopropyltriethoxy silane (APTES) was made. Its pH was adjusted to 5.5 by the addition of concentrated acetic acid. The reaction was stirred while hydrolyzing for 1 hr.

The interior of the container was filled with the silanization mixture and let sit for 30 minutes. The container was then rinsed with copious amounts of MQ water and allowed to dry prior to subsequent coatings.

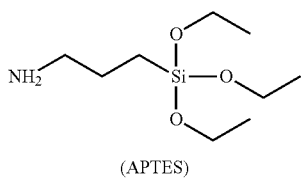

(APTES)

P-cat coating was applied on PMMA pitcher coated with primer by dip coating with the suspension. Excess coating suspension was removed, and a uniform coating achieved, by spinning at 100 rpm for 5 minutes. The coated pitcher was cured at ambient atmosphere and temperature for about 12 hours.

EXAMPLE 6

Silicone modified polyester resin (ShinEtshu KR-5230) was weighed in a glass vial. Propylene glycol monomethyl ether acetate (PGMA) (Sigma-Aldrich 99%, CAS Number 108-65-6) was added to the vial to make a mixture of 20 wt % of resin. The vial containing the solution was then placed in a THINKY mixer and mixed for two minutes to produce the binder solution. $Cu_xO$ loaded $SnO_2$ (P-CAT), nominal copper loading of 1%, was added to the glass vial at a P-CAT-to-binder solution weight ratio of 1:10 to create the photocatalyst suspension. The glass vial containing P-CAT and binder was placed in a sonication bath and sonicated for one hour. The suspension was passed through a stainless steel mesh filter having 10 micron openings before being tape cast onto a PET substrate. Prior to tape casting, the PET substrate surface was prepared by corona treatment at speed of 0.5 m/min and power of 100 W for two scans. The corona treated PET substrate was tape coated by doctor blade tape caster at a gap of 75 to 250 microns.

Figure 8:
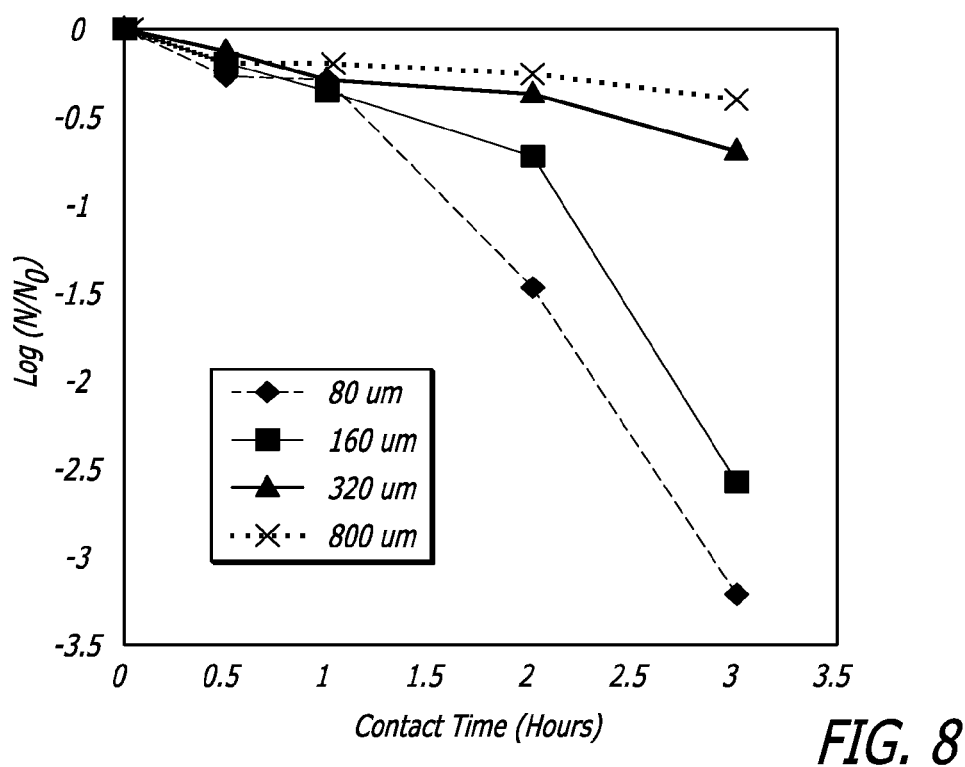
FIG. 8 is a graph showing the antibacterial activity on *E. coli* over time by photocatalytic elements at various distances from the bacteria.

A PET substrate, prepared as above, was then placed in a 28 mm diameter beaker containing 100,000 E. coli (ATCC 8739). The distance between the surface of the prepared PET substrate and the beaker was controlled by the volume of water in the vial. The process was repeated for various distances. Results appear in FIG. 8.

EXAMPLE 7

Sheet Durability Test

Figure 10:
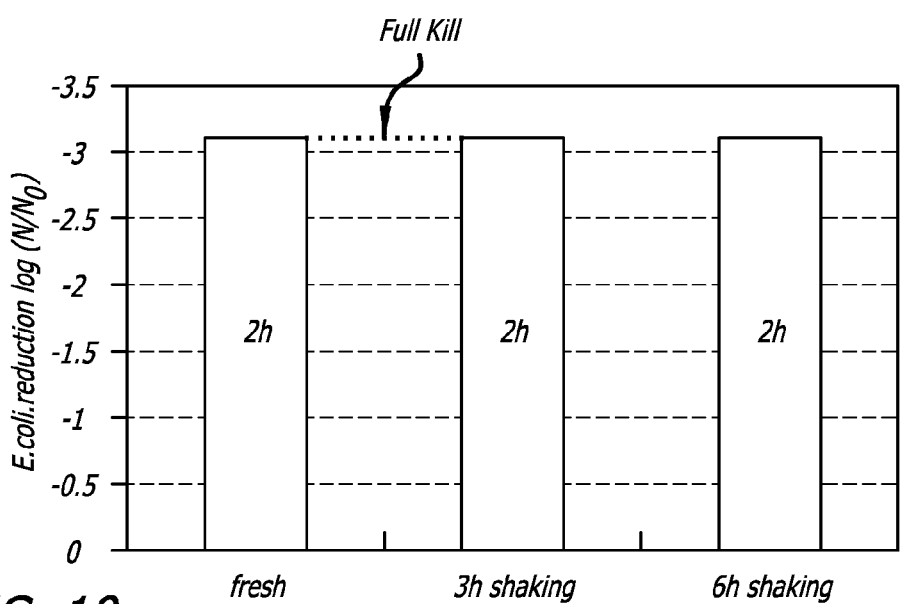
FIG. 10 is a graph showing the results of a durability test on the photocatalytic elements demonstrating the antibacterial activity against *E. coli* after shaking.

P-CAT loaded PES sheets were cut into 2"×1" pieces. The pieces were placed in a bottle of tap water and shaken at about 250 rpm. Two test groups were made, the first was shaken for 3 hours, and the second was shaken for 6 hours. The pieces were then removed from the water. Together with untreated pieces, these were tested using a standard antimicrobial test in E. coli. The result showed no change in activity for such sheets, after incubation (with shaking) in tap water of indicated duration. Results are shown in FIG. 10.

EXAMPLE 8

Antimicrobial Performance Challenge Test

Figure 12:
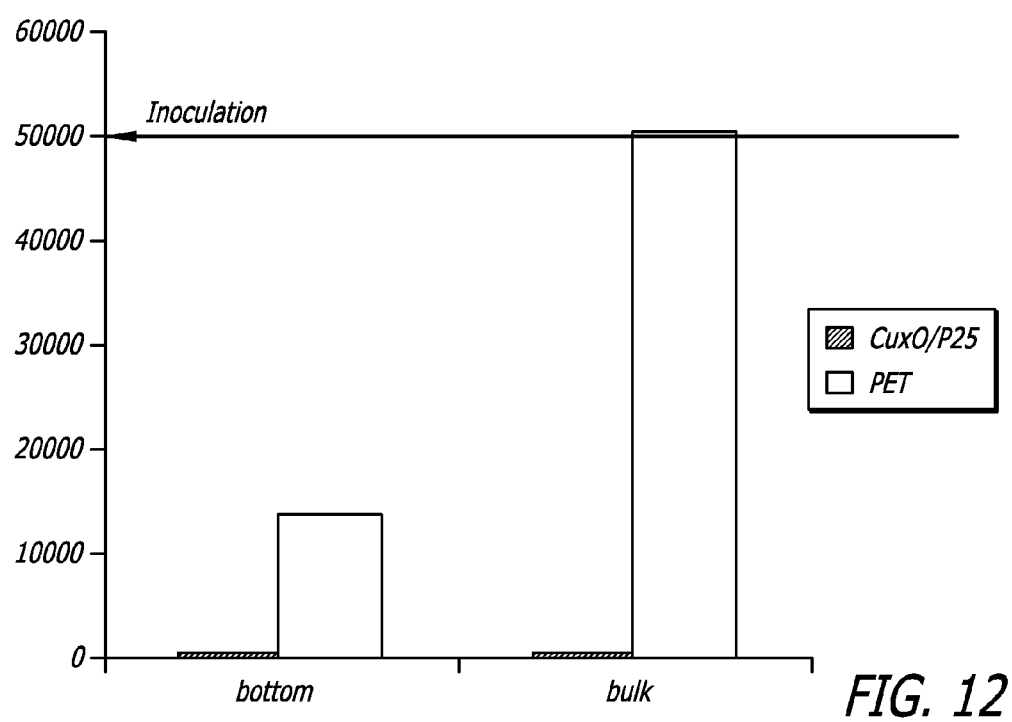
FIG. 12 is a graph showing antibacterial activity against *E. coli* at various locations in a pitcher.

Three pitchers were used: two experimental pitchers were prepared with P-CAT loaded PET sheets on the sides and bottom of the pitcher, and one control pitcher was left untreated. The P-CAT loaded PET sheets used in the pitchers were made according to the process disclosed in U.S. Provisional Patent Application 61/899,423, filed on Nov. 4, 2013. Concentrated E. coli was added to each pitcher and left over night, without mixing. The control pitcher and one experimental pitcher were left exposed to light, and one experimental pitcher was left in darkness. Samples of water were taken from the surface of the pitcher and from the center of the pitcher (away from the bottom and all sides). Results are shown in FIG. 12.

EXAMPLE 9

Antimicrobial Performance->Real World Application Test

The bio-burden in tap water is mainly controlled by the presence of chlorine (2-3 ppm in Oceanside, Calif.). Under these conditions, 500 CFU/mL (2.7 log HPC (Heterotrophic Plate Count)) are typically seen. De-chlorination is often done with sodium metabisulfite (SMBS) as follows:

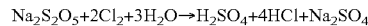

The weight ratio between SMBS and chlorine, according to the above reaction, is 190:142=1.34 In practice, this ratio is 3. As a result, 6-9 ppm of SMBS is used for effective de-chlorination.

Figure 13:
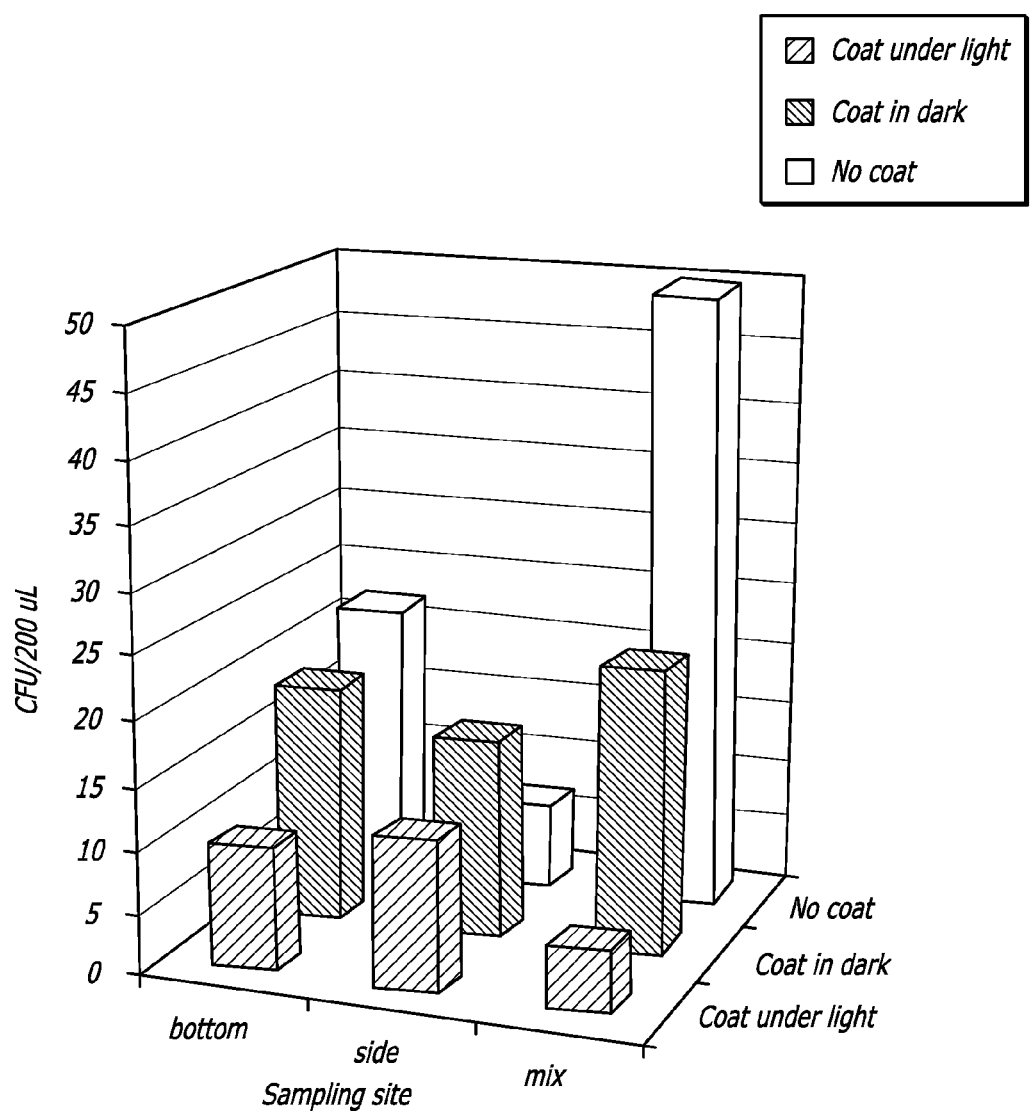
FIG. 13 is a graph depicting bacterial growth at various locations in a pitcher, under various conditions, when checked on day 2.
Figure 14:
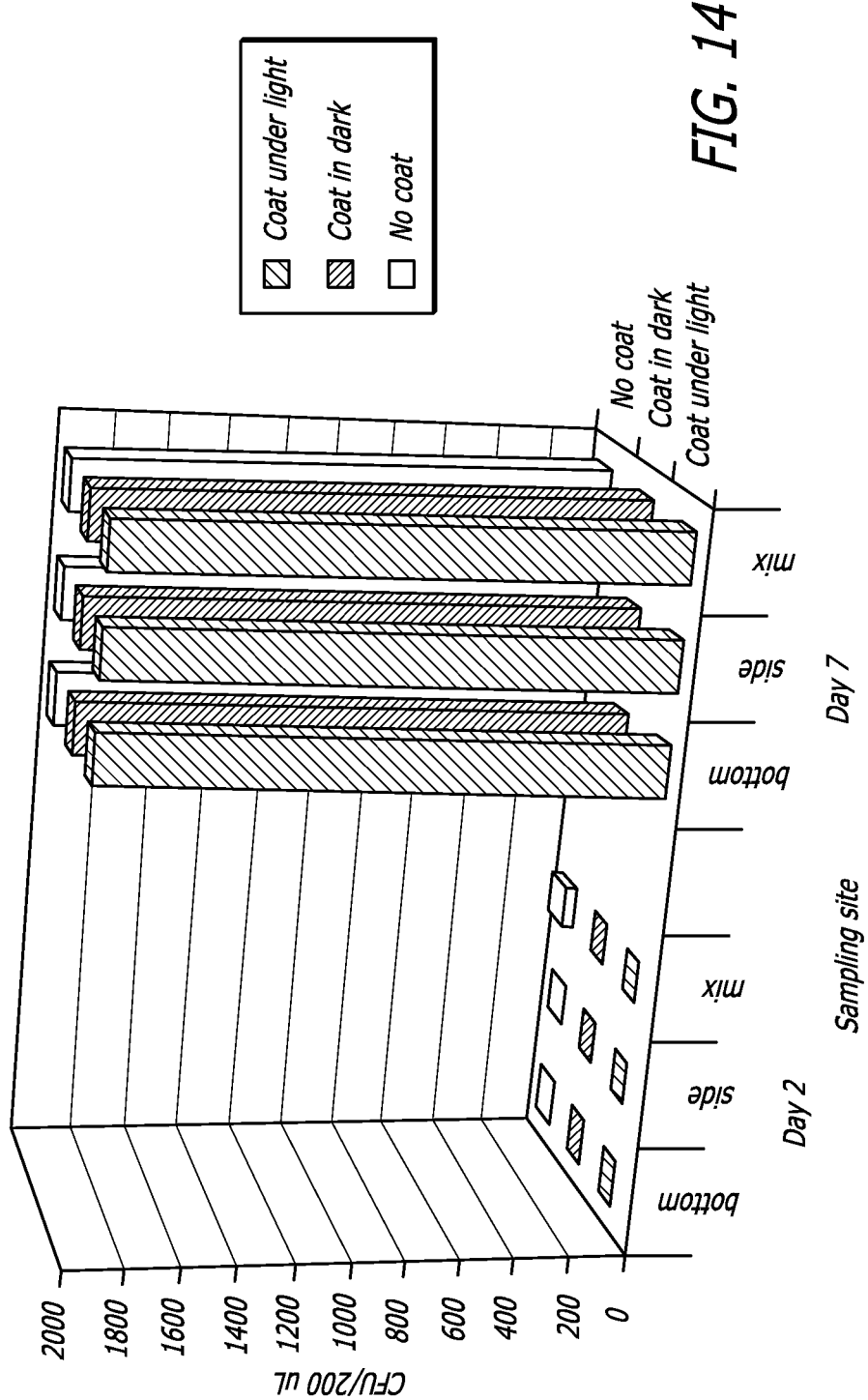
FIG. 14 is a graph depicting bacterial growth at various locations in a pitcher, under various conditions, when checked on day 7 vs day 2.

Three pitchers were used, as in Example 6 above. Three pitchers were prepared with 2.5 L of de-chlorinated tap water, with 8 ppm SMBS, and the fourth pitcher was prepared with 2.5 L of untreated tap water. Samples of the water were taken from the surfaces of each pitcher, both near the bottom and near the sides, and the middle of each pitcher (away from the bottom and all sides). The presence of Bacillus sphaericus, an active ingredient of the larvicide often used in municipal and industrial water treatment facilities for mosquito control was measured. Samples were taken after 2 days and after 7 days. Results for bacteria present in de-chlorinated tap water, P-cat coated films showed some inhibitory effect when checked on day 2, and appear in FIG. 13. When checked on day 7, all pitchers with de-chlorinated tap water showed significant bacteria growth. The population was dominated by one or two species, against which P-CAT film had apparently no effect. Results are depicted in FIG. 14.

In the de-chlorinated tap water, B. sphaericus exists as spores, and can convert to bacteria when condition is favorable (e.g. under standard test). Our standard test showed full killing of B. sphaericus in 2 hours. The population of spores can be controlled by destroying the bacteria, effectively ceasing its reproduction.

Figure 11:
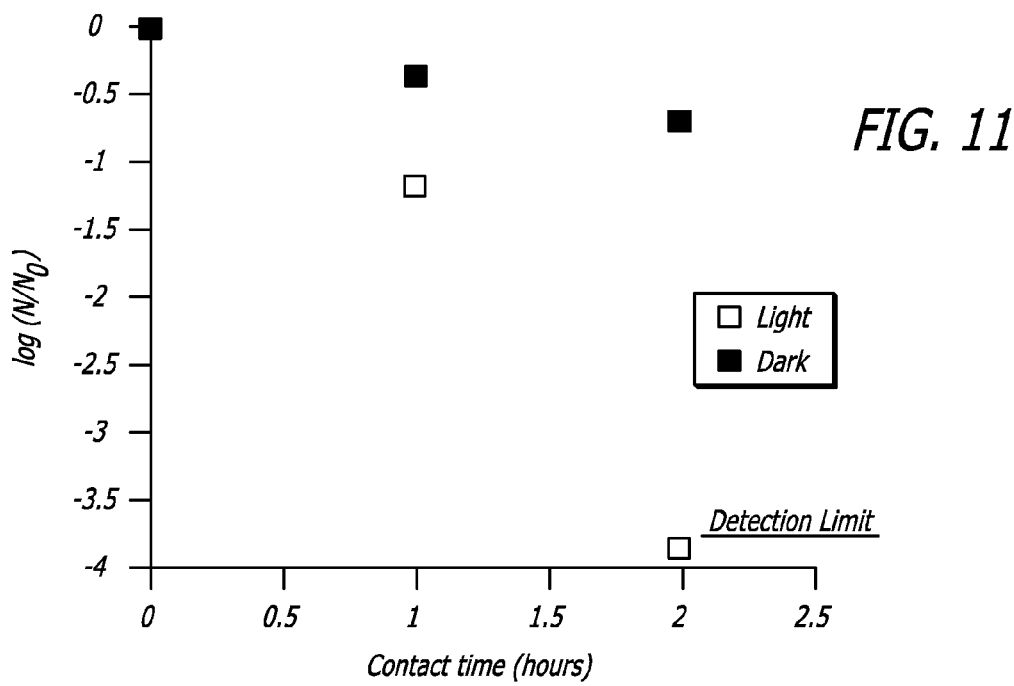
FIG. 11 is a graph showing the antibacterial activity against *Bacillus spaericus* over time.

The disinfecting effect of the P-cat on B. sphaericus bacteria is shown in FIG. 11.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A device for producing a drinkable aqueous liquid from feed liquid comprising:
   a first fluid reservoir for receiving an aqueous feed liquid;
   a filter, in fluid communication with both the first fluid reservoir and a second fluid reservoir;
   wherein the filter is configured to size exclude undesired materials as the aqueous feed liquid passes from the first fluid reservoir to the second fluid reservoir, so that a sufficient amount of undesired materials are removed from the aqueous feed liquid to provide drinkable water to the second fluid reservoir by one pass of the aqueous feed liquid through the filter; and
   a photocatalyst, comprising 1) a titanium oxide and 2) copper, tin, or a combination thereof, disposed within the first fluid reservoir or the second fluid reservoir and contacting the water contained therein;
   wherein at least one of the first and second fluid reservoirs is substantially transparent to visible light.

2. The device of claim 1, wherein the photocatalyst is within a distance of 300 μm from a surface of the filter.

3. The device of claim 1, wherein the photocatalyst is disposed within the first fluid reservoir within a distance of 300 μm from a surface of the first fluid reservoir.

4. The device of claim 1, wherein the photocatalyst is disposed within the second fluid reservoir within a distance of 300 μm from a surface of the second fluid reservoir.

5. The device of claim 1, wherein the second fluid reservoir further includes an exit opening configured to allow processed fluid to be removed from the second fluid reservoir.

6. The device of claim 1, wherein the first fluid reservoir is substantially opaque to ultraviolet light.

7. The device of claim 1, wherein the second fluid reservoir is substantially opaque to ultraviolet light.

8. The device of claim 1, wherein the device is configured so that a pressure differential between the first fluid reservoir and the second fluid reservoir of at least about 1 psi will induce fluid flow across the filter.

9. The device of claim 8, wherein the second fluid reservoir includes an exit opening configured to provide a partial vacuum to the second fluid reservoir that will induce the fluid flow across the filter.

10. The device of claim 8, wherein the first or second reservoir comprises deformable material, wherein deformation of the reservoir induces the fluid to cross the filter.

11. The device of claim 1, wherein the filter is tubular, having an exterior surface in fluid contact with the interior of the first fluid reservoir and an interior that forms a connecting lumen in fluid communication with the second fluid reservoir.

12. The device of claim 1, wherein the filter has flow rate of about 0.001 liters/min to about 0.1 liters/min.

13. The device of claim 1, wherein the filter comprises an ultrafiltration material.

14. The device of claim 1, wherein the filter is a U-shaped tube having an exterior surface in fluid contact with the interior of the first fluid reservoir, wherein the U-shape tube has two ends and an interior lumen, wherein the interior lumen is in fluid communication with the second fluid reservoir via the two ends of the U-shaped tube.

15. The device of claim 1, wherein the photocatalyst is photocatalytic.

16. The device of claim 15, wherein at least about 70% of the antimicrobial activity of the photocatalyst is due to visible light photocatalysis.

17. The device of claim 15, wherein at least about 90% of the antimicrobial activity of the photocatalyst is due to visible light photocatalysis.

18. The device of claim 1, further comprising a light source providing sufficient illumination to the photocatalyst to cause an antimicrobial effect due to photocatalysis.

19. The device of claim 1, wherein the photocatalyst is affixed to a surface within the first fluid reservoir.

20. The device of claim 1, wherein the first fluid reservoir has an interior surface, and wherein the photocatalyst is a coating disposed on the interior surface.

21. The device of claim 1, wherein the filter has an exterior surface in contact with the interior of the first fluid reservoir, wherein the photocatalyst is affixed to the exterior surface of the filter.

22. The device of claim 1, further comprising a translucent matrix disposed within the interior of the first fluid reservoir, wherein the photocatalyst is affixed on the translucent matrix in the first fluid reservoir.

23. The device of claim 1, wherein the photocatalyst is disposed in the interior of the first fluid reservoir.

24. The device of claim 1, wherein the photocatalyst is disposed in the interior of the second fluid reservoir.

25. The device of claim 1, wherein the photocatalyst is disposed in the interior of the first fluid reservoir and in the interior of the second fluid reservoir.

26. The device of claim 1, wherein the device effects the substantial destruction of microbiological metabolites including odor or taste altering organic molecules.

27. The device of claim 1, wherein the device effects the substantial destruction of microbiological entities.

28. The device of claim 27, wherein the microbiological entities are viruses, protozoa, prions, fungi, bacteria, or fragments thereof.

29. The device of claim 1, wherein the device effects the substantial destruction of fragments of microbiological entities.

30. The device of claim 1, wherein the device effects the substantial removal of materials having a size of about 10 nm to about 10 microns.

31. The device of claim 1, wherein the photocatalyst contacts a surface of the first fluid reservoir, the second fluid reservoir, or the filter, to disinfect the surface.

32. A method for disinfecting a fluid, comprising the steps of:
providing the device of claim 1;
passing an unprocessed fluid from the first reservoir through the filter second fluid reservoir; and
enabling access to the fluid contained with the second reservoir.

33. The method of claim 32, further comprising disposing the photocatalyst in the first fluid reservoir with the unprocessed fluid.

34. The method of claim 32, further comprising disposing the photocatalyst in the second fluid reservoir with the processed fluid.

35. The method of claim 32, further comprising selectively altering the pressure between the first reservoir and the second reservoir to induce passage of the unprocessed fluid across the filter.

* * * * *